United States Patent
Kitamura et al.

(10) Patent No.: US 9,261,649 B2
(45) Date of Patent: Feb. 16, 2016

(54) METHOD FOR MANUFACTURING SEMICONDUCTOR OPTICAL WAVEGUIDE DEVICE, AND SEMICONDUCTOR OPTICAL WAVEGUIDE DEVICE

(71) Applicant: SUMITOMO ELECTRIC INDUSTRIES, LTD., Osaka (JP)

(72) Inventors: Takamitsu Kitamura, Fujisawa (JP); Hideki Yagi, Machida (JP); Naoya Kono, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/657,781

(22) Filed: Mar. 13, 2015

(65) Prior Publication Data

US 2015/0260915 A1   Sep. 17, 2015

(30) Foreign Application Priority Data

Mar. 14, 2014   (JP) ................................. 2014-052237

(51) Int. Cl.
| | |
|---|---|
| G02B 6/02 | (2006.01) |
| G02B 6/136 | (2006.01) |
| G06Q 20/20 | (2012.01) |
| G02B 6/122 | (2006.01) |
| G02B 6/12 | (2006.01) |

(52) U.S. Cl.
CPC .............. G02B 6/136 (2013.01); G02B 6/1228 (2013.01); G02B 2006/12173 (2013.01)

(58) Field of Classification Search
CPC .. G02B 6/02; G02B 6/12173; G02B 6/12176; G02B 6/136; G02B 6/1228; G02B 3/1257; G02B 2/1235; G06Q 20/209; G02F 1/2257; G02F 2001/212; G06F 3/1203

USPC ............ 385/14–24, 131–134; 216/2; 257/98, 257/103

See application file for complete search history.

(56) References Cited

U.S. PATENT DOCUMENTS

| | | | | |
|---|---|---|---|---|
| 5,783,844 | A  * | 7/1998 | Kobayashi | ............. G02B 6/125 257/103 |
| 6,310,995 | B1 | 10/2001 | Saini et al. | |
| 9,158,139 | B2 * | 10/2015 | Kitamura | ............ G02F 1/01716 |
| 2009/0052834 | A1 * | 2/2009 | Tanaka | ................... G02B 6/125 385/14 |
| 2014/0291717 | A1 * | 10/2014 | Kitamura | ............ G02F 1/01716 257/98 |
| 2015/0043867 | A1 * | 2/2015 | Kono | ................... G02F 1/2257 385/3 |

* cited by examiner

*Primary Examiner* — Akm Enayet Ullah
(74) *Attorney, Agent, or Firm* — Smith, Gambrell & Russell LLP.

(57) ABSTRACT

A method for manufacturing a semiconductor optical waveguide device includes the steps of forming a waveguide mesa having first and second portions by etching a stacked semiconductor layer through a first mask; forming a dummy buried region embedding a top surface and side surfaces of the waveguide mesa; forming a second mask on the dummy buried region, the second mask having an opening on the first portion and having a pattern on the second portion; forming a third mask having an opening that reaches a top surface of the first portion, the third mask including a dummy buried mask formed by etching the dummy buried region through the second mask; forming an upper mesa by etching the waveguide mesa through the third mask; and after removing the third mask, forming a lower mesa by etching the stacked semiconductor layer, the lower mesa having a greater width than that of the upper mesa.

12 Claims, 34 Drawing Sheets

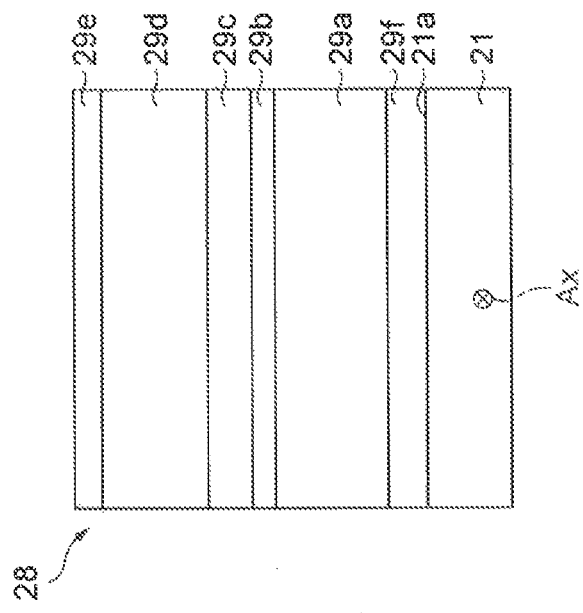
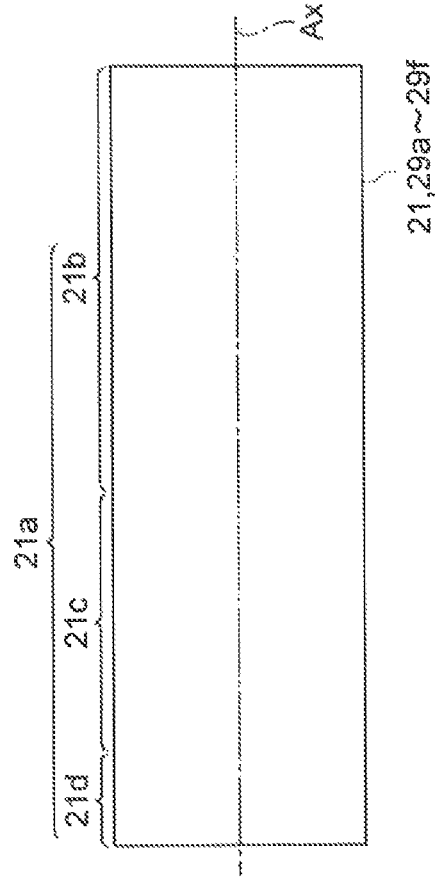
FIG. 2A
FIG. 2B

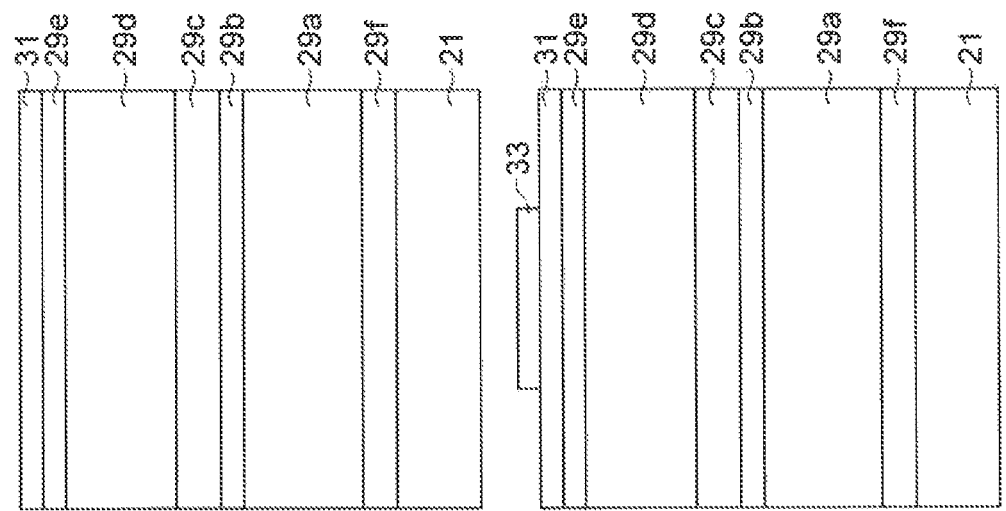
FIG. 3A
FIG. 3B
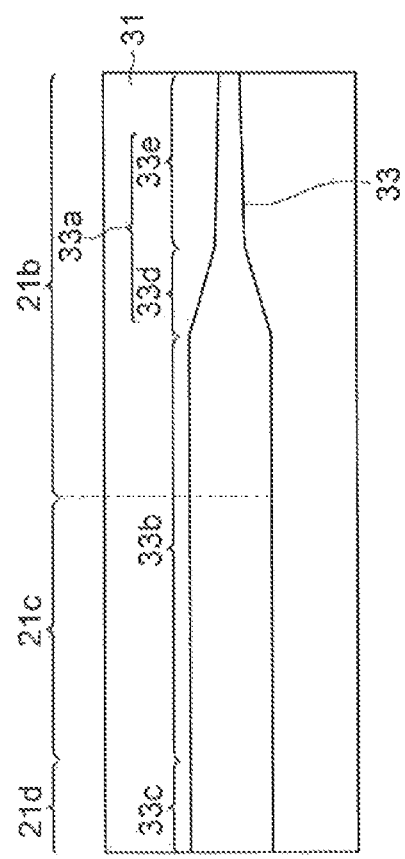
FIG. 3C

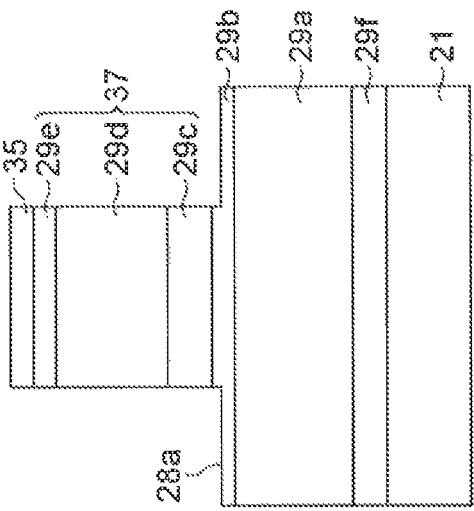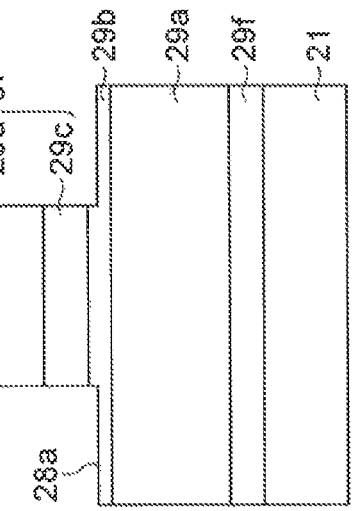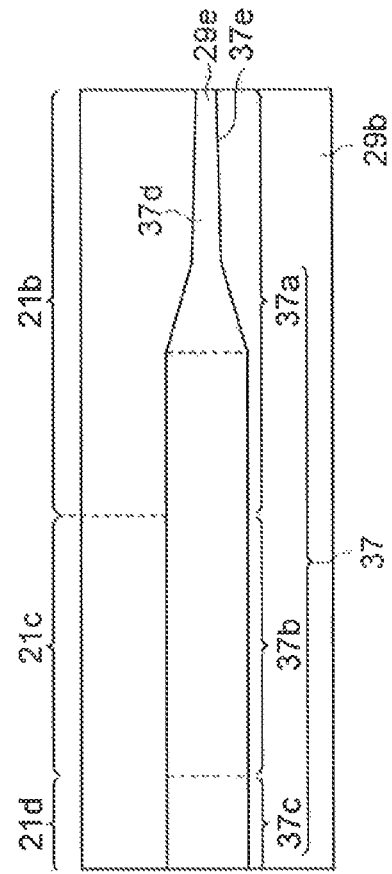

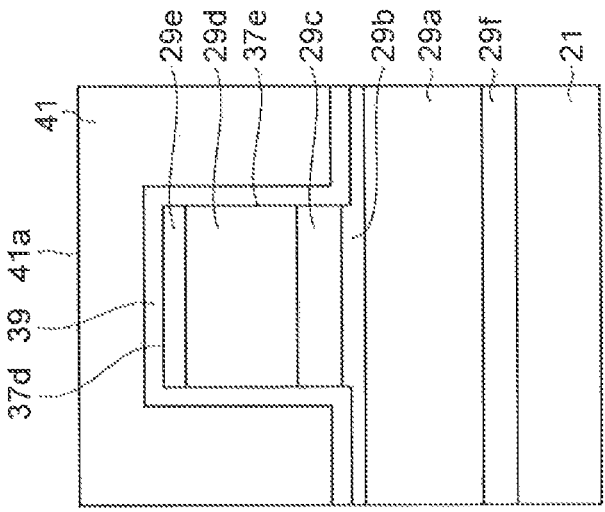
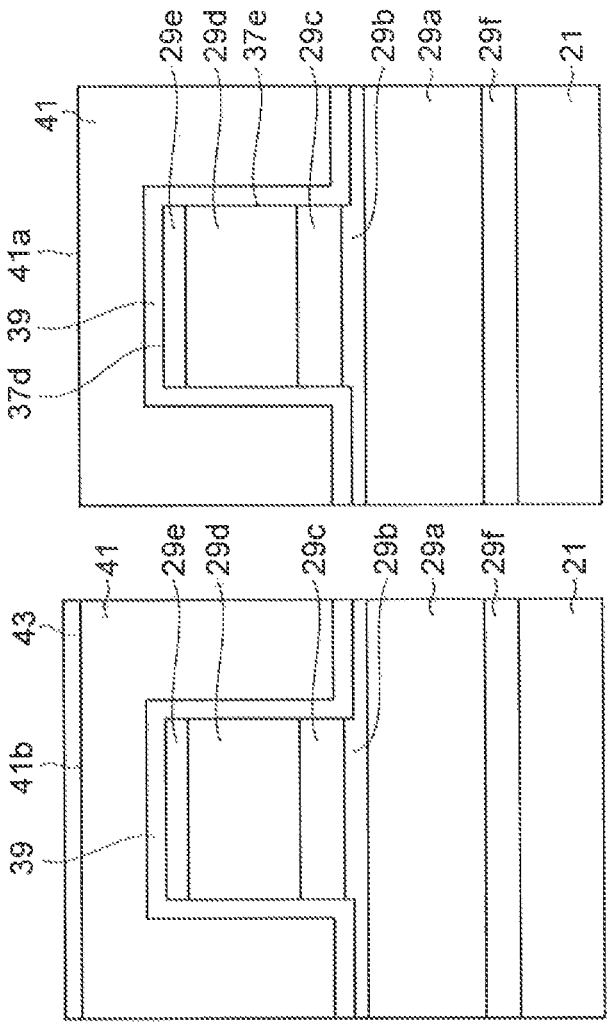
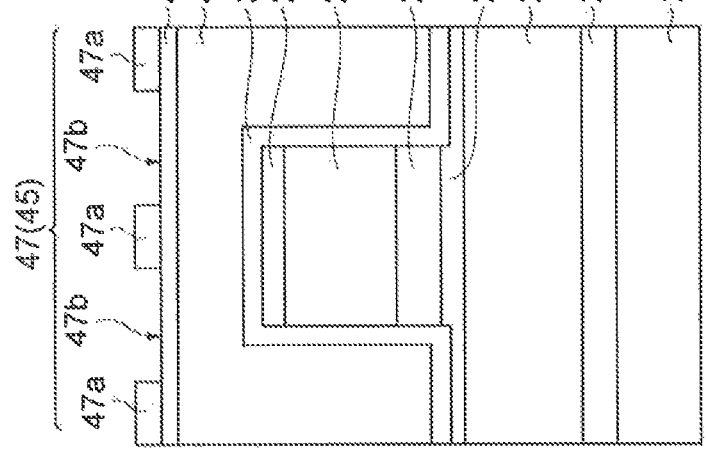

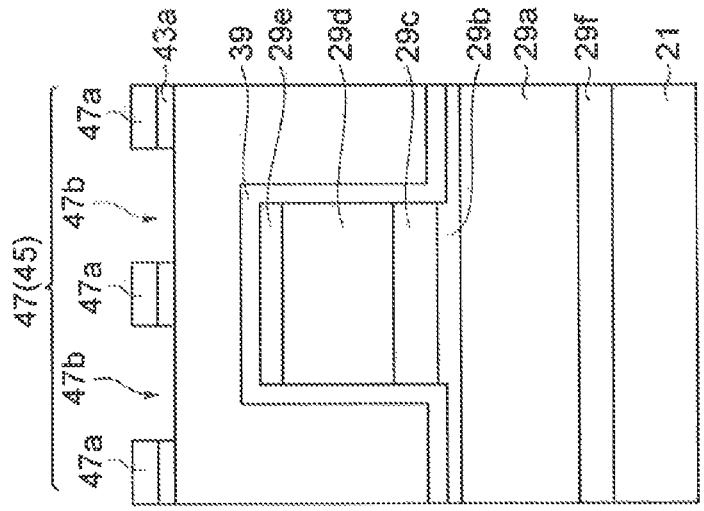
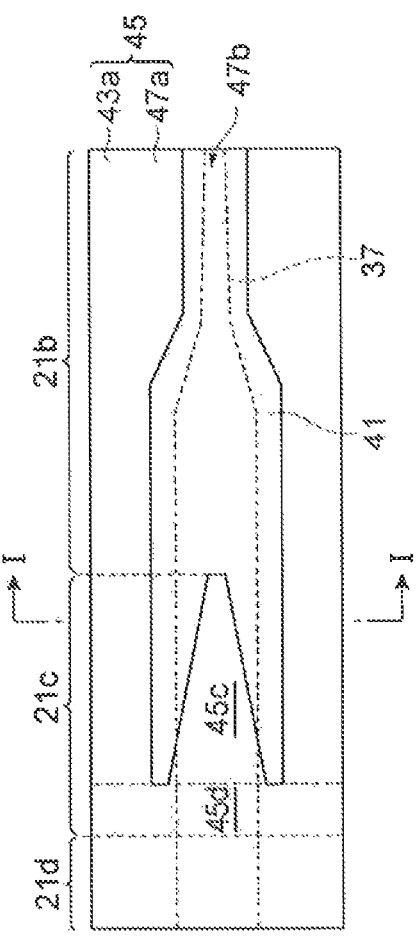
FIG. 8A
FIG. 8B

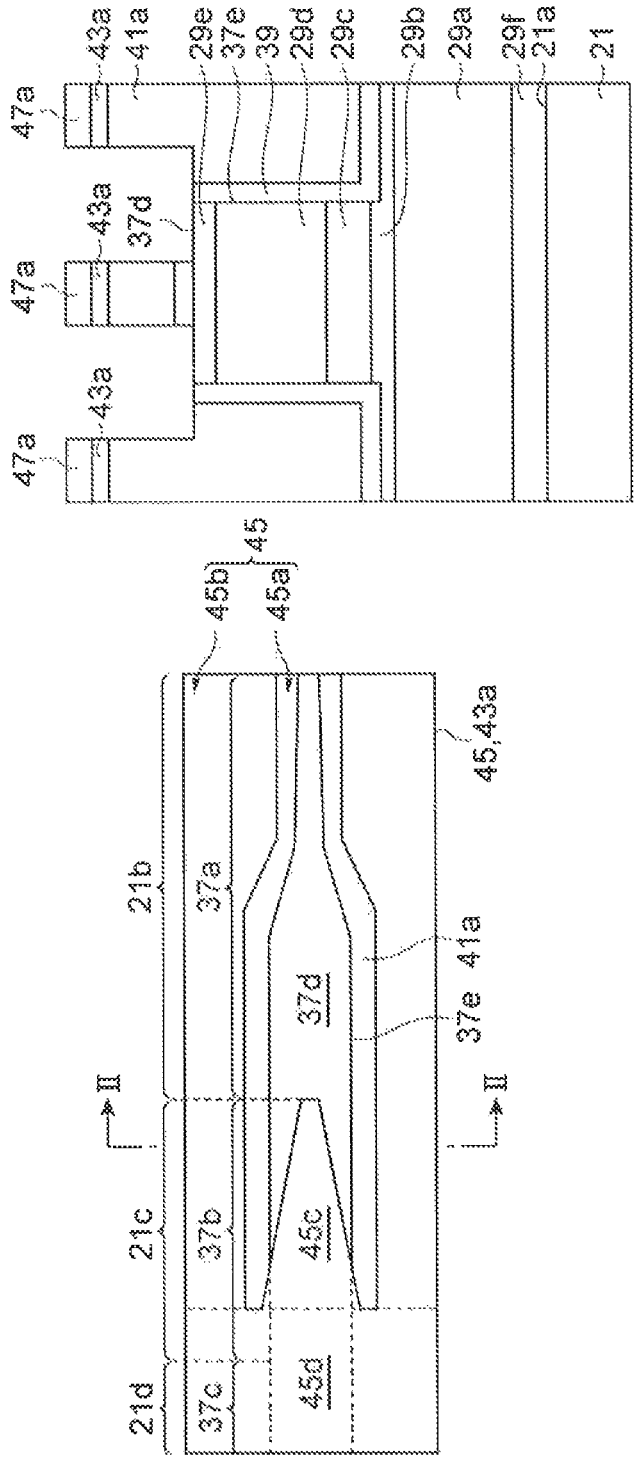

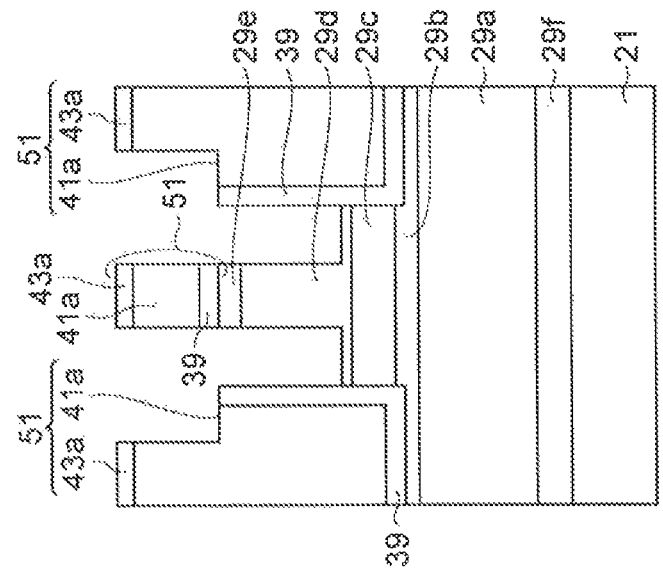
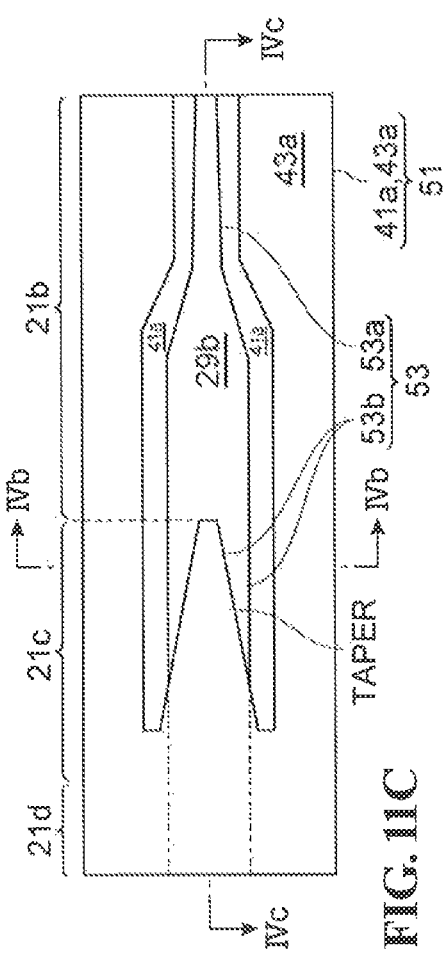
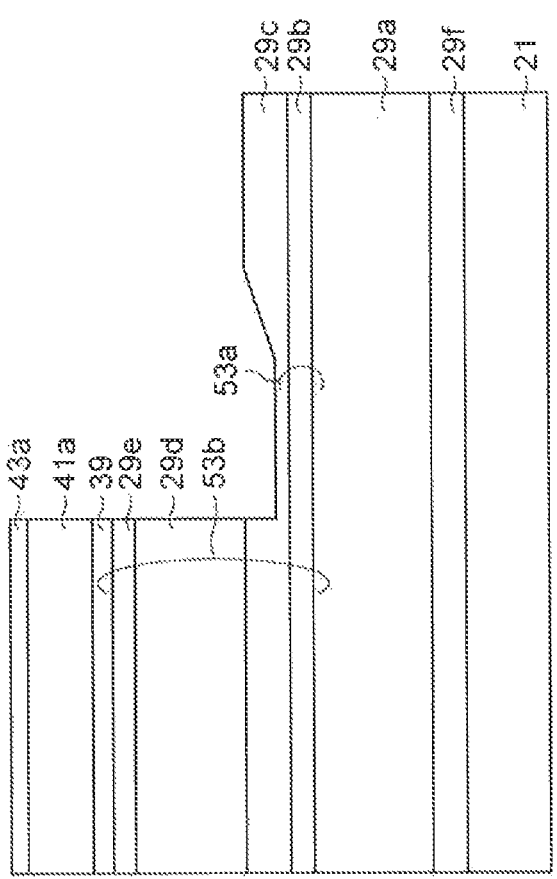

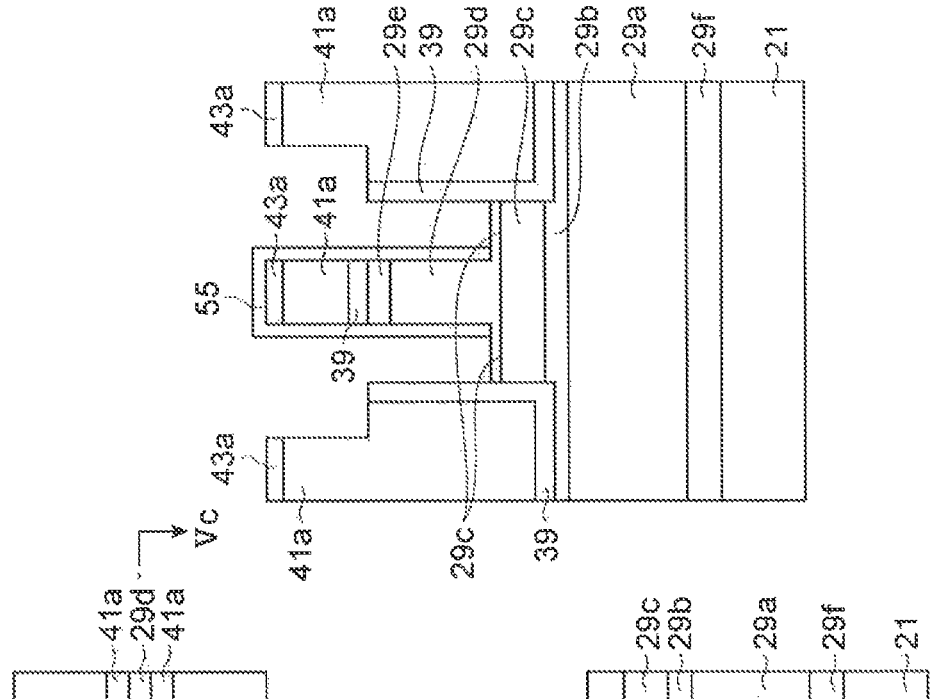
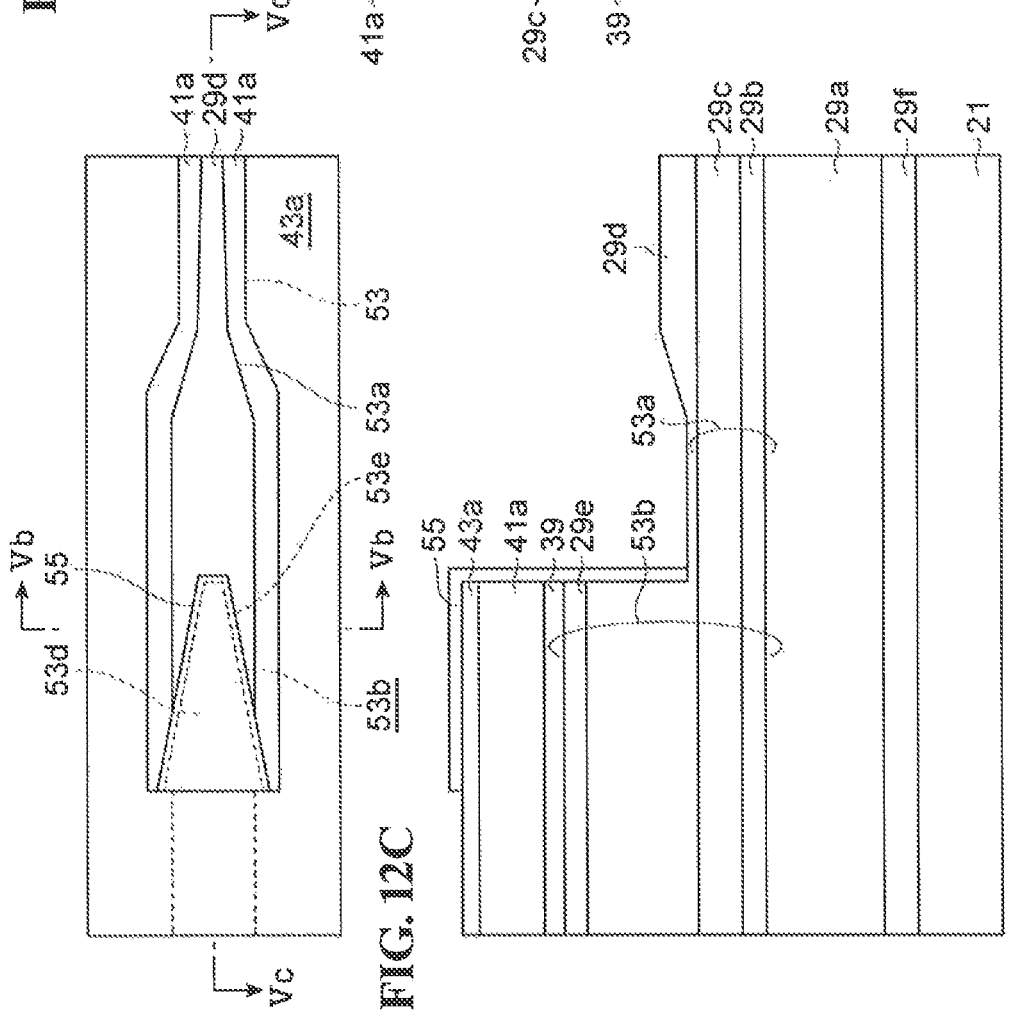

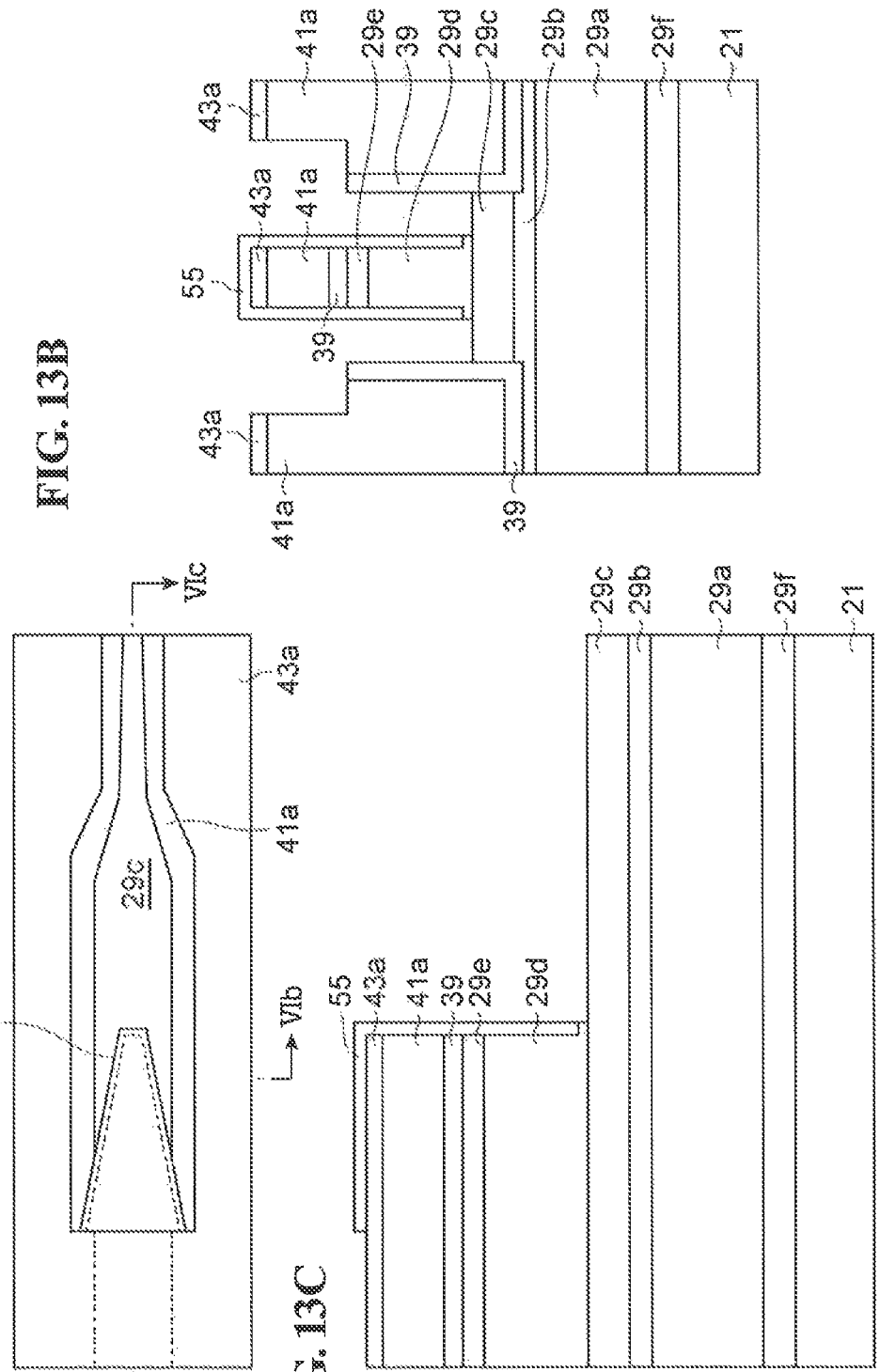

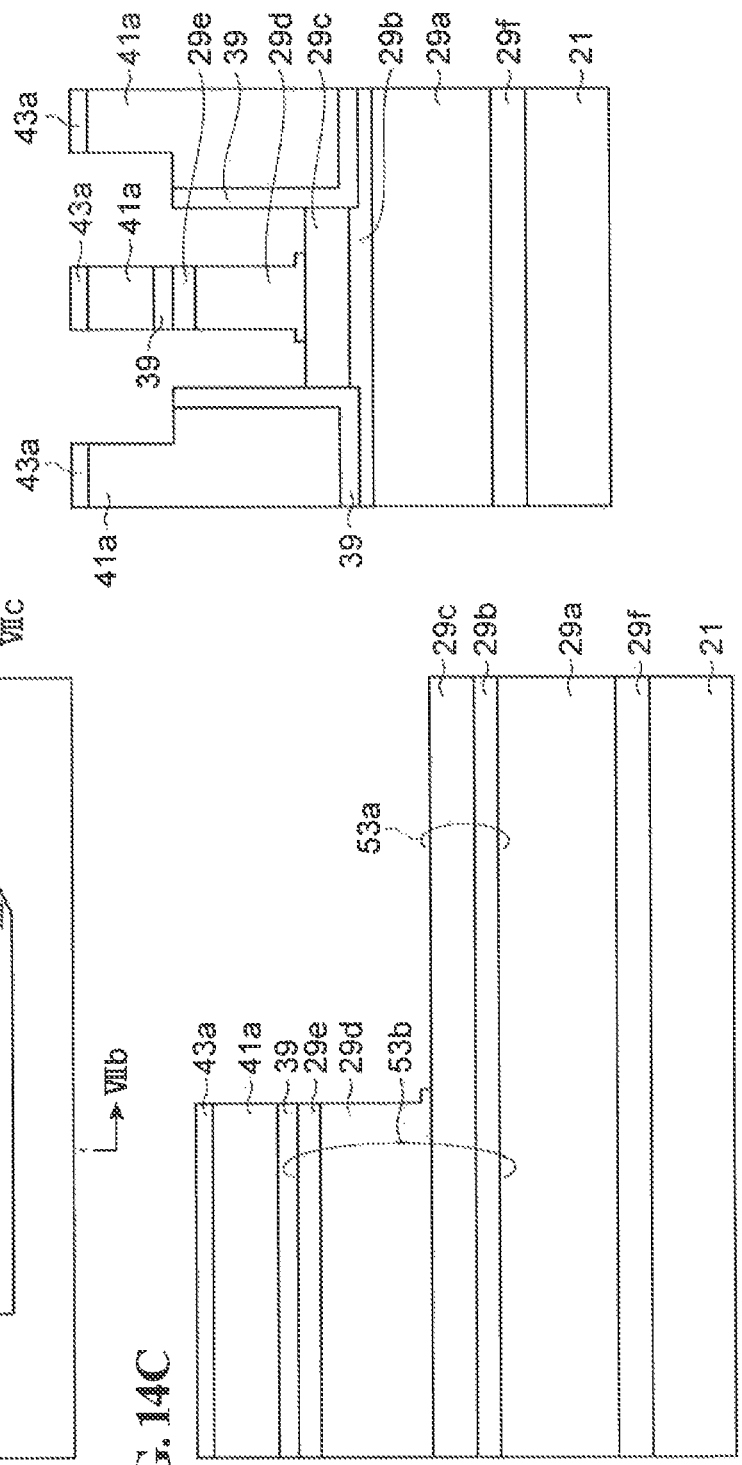

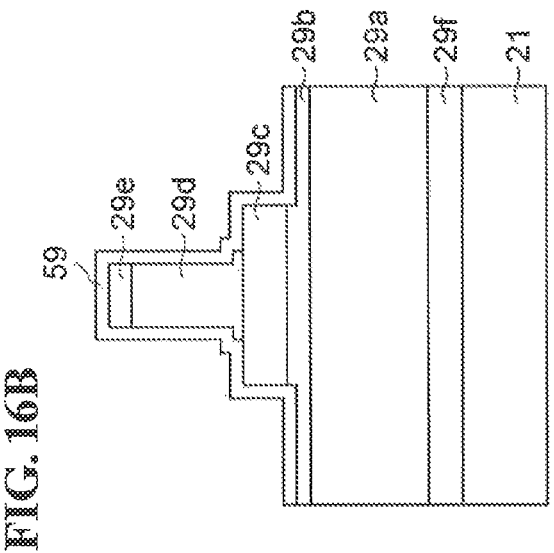
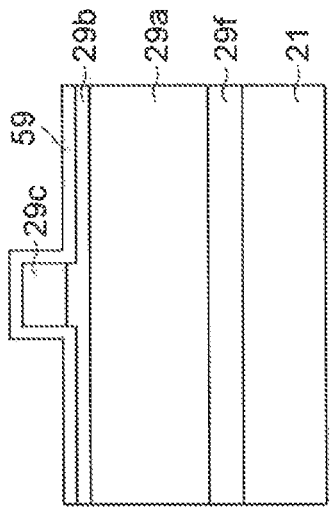
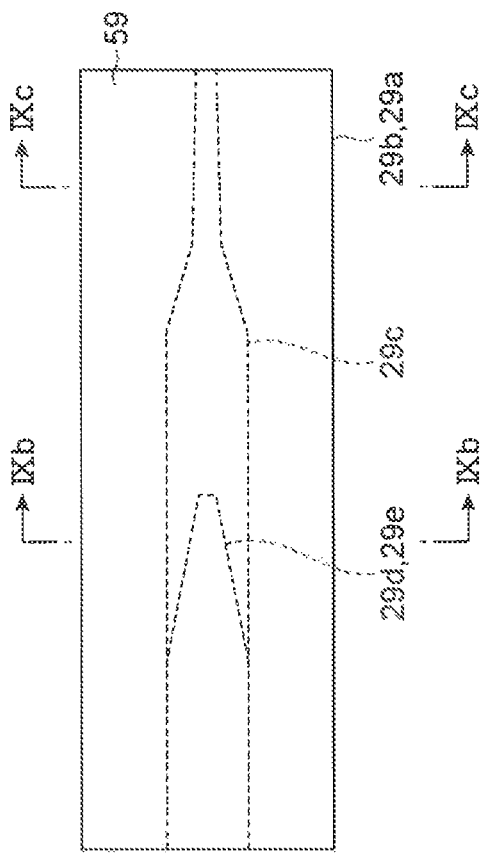

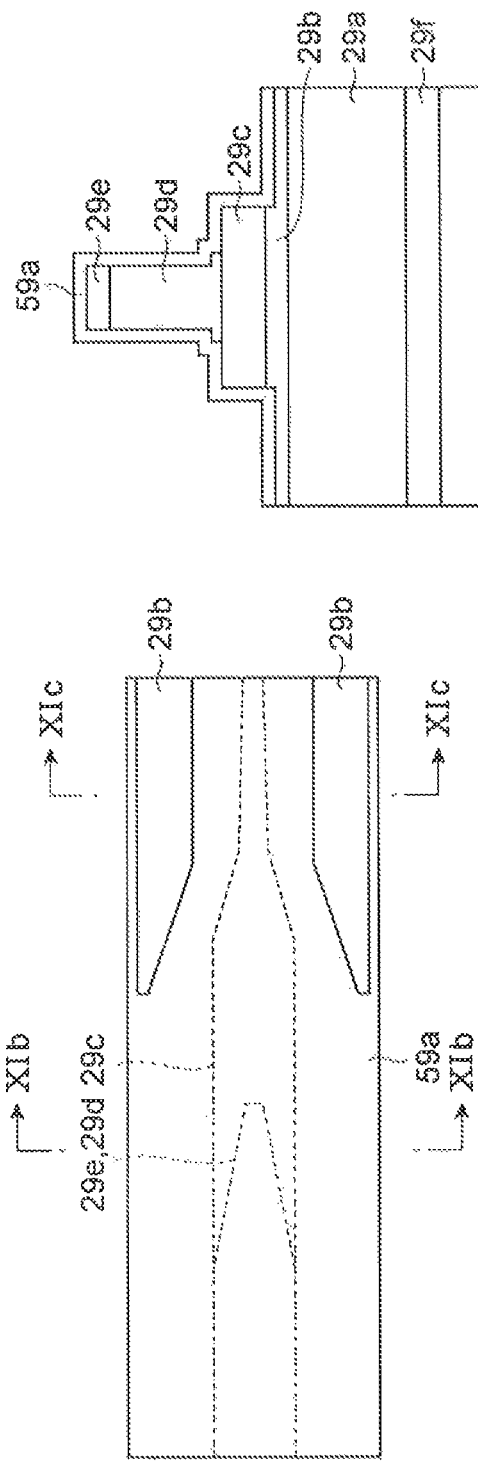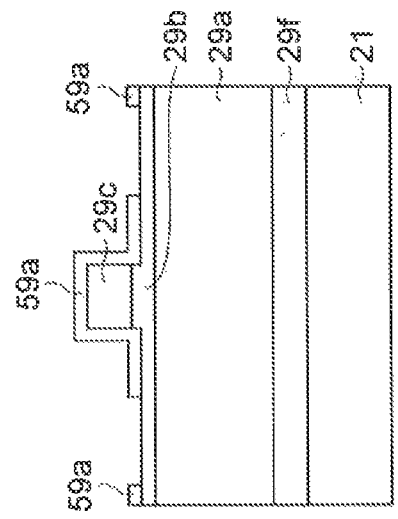
FIG. 18A
FIG. 18B
FIG. 18C

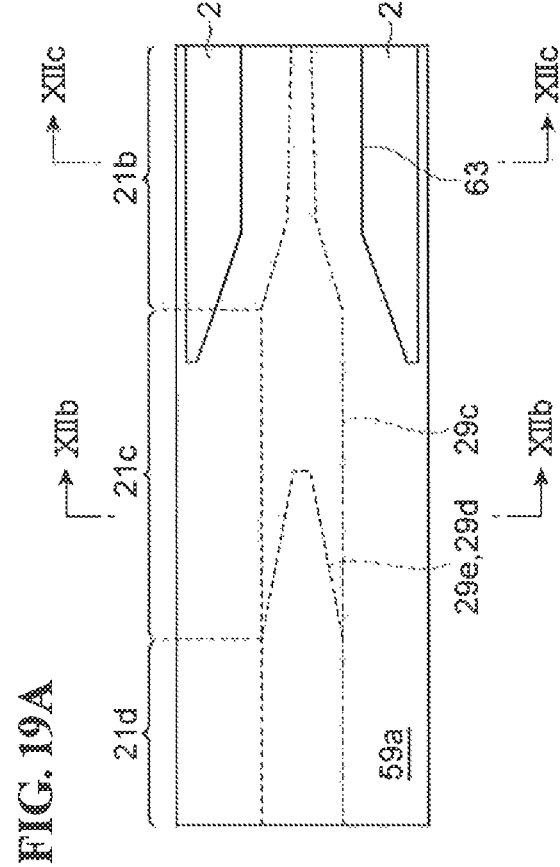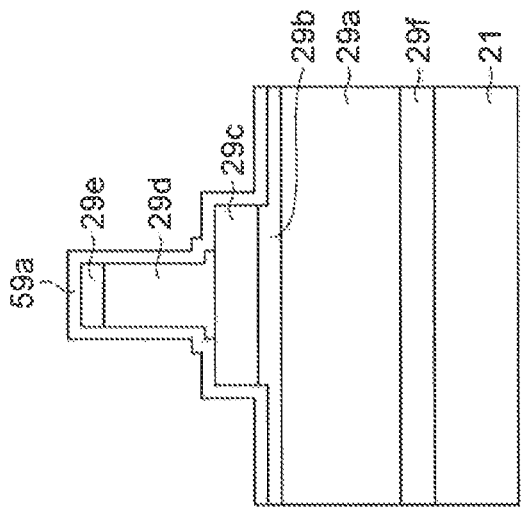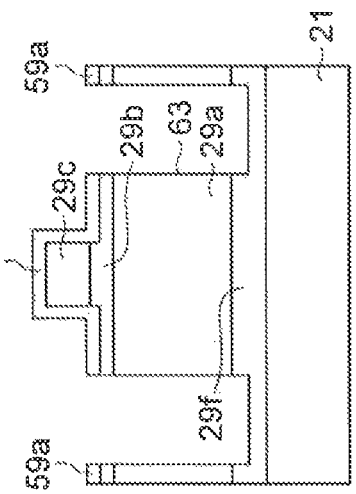

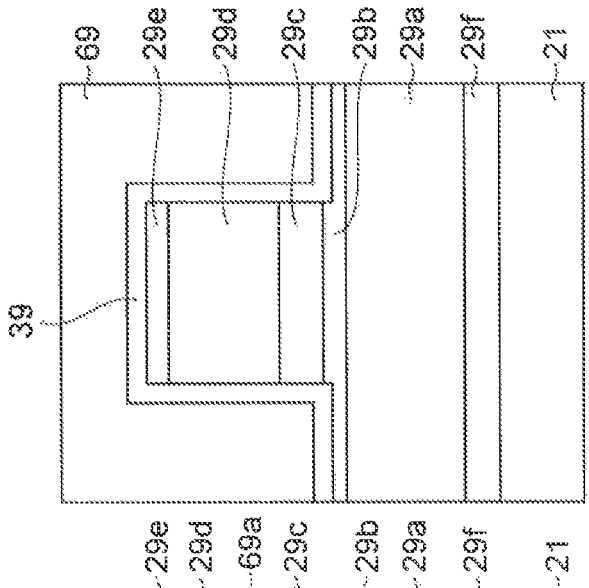
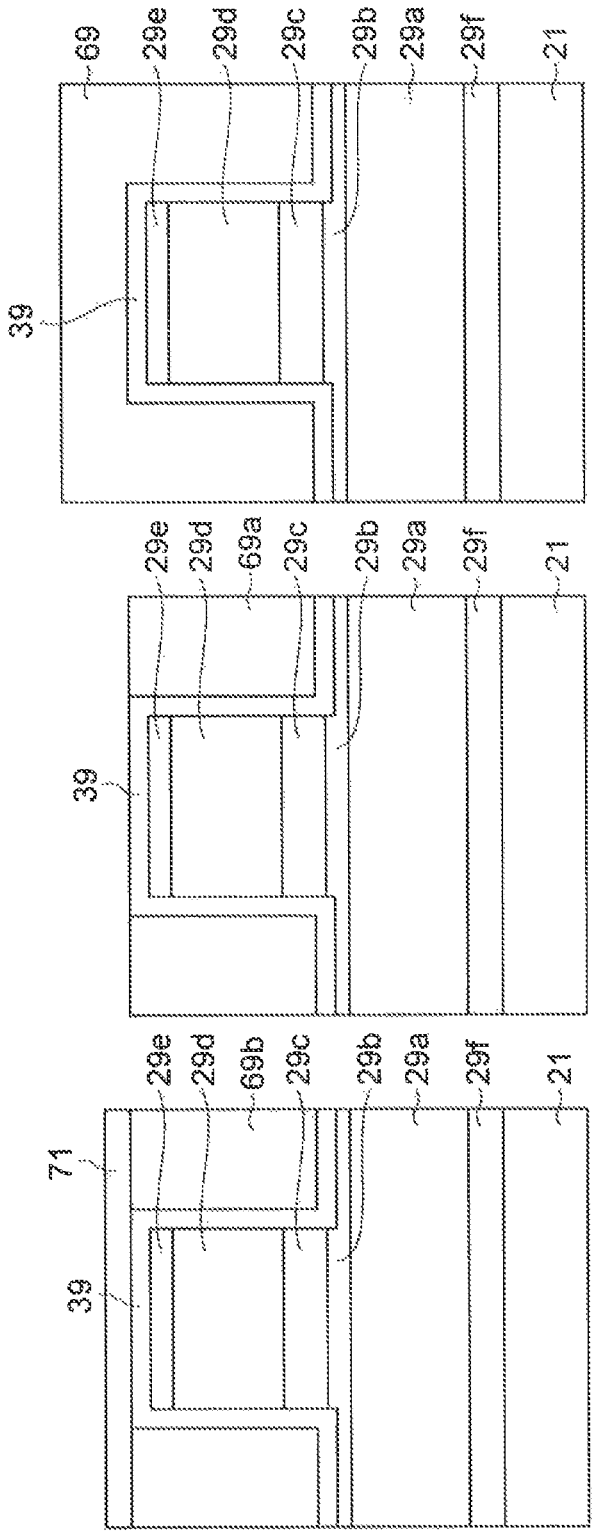
FIG. 22A
FIG. 22B
FIG. 22C

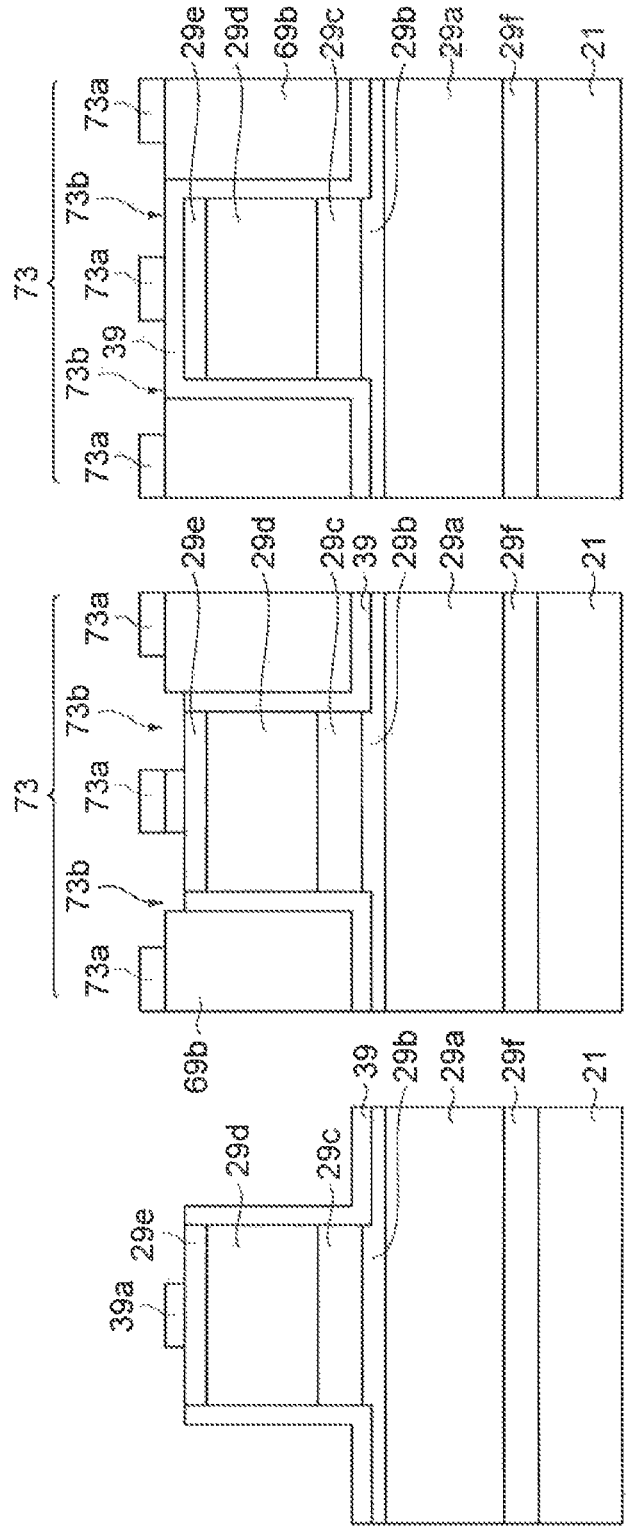

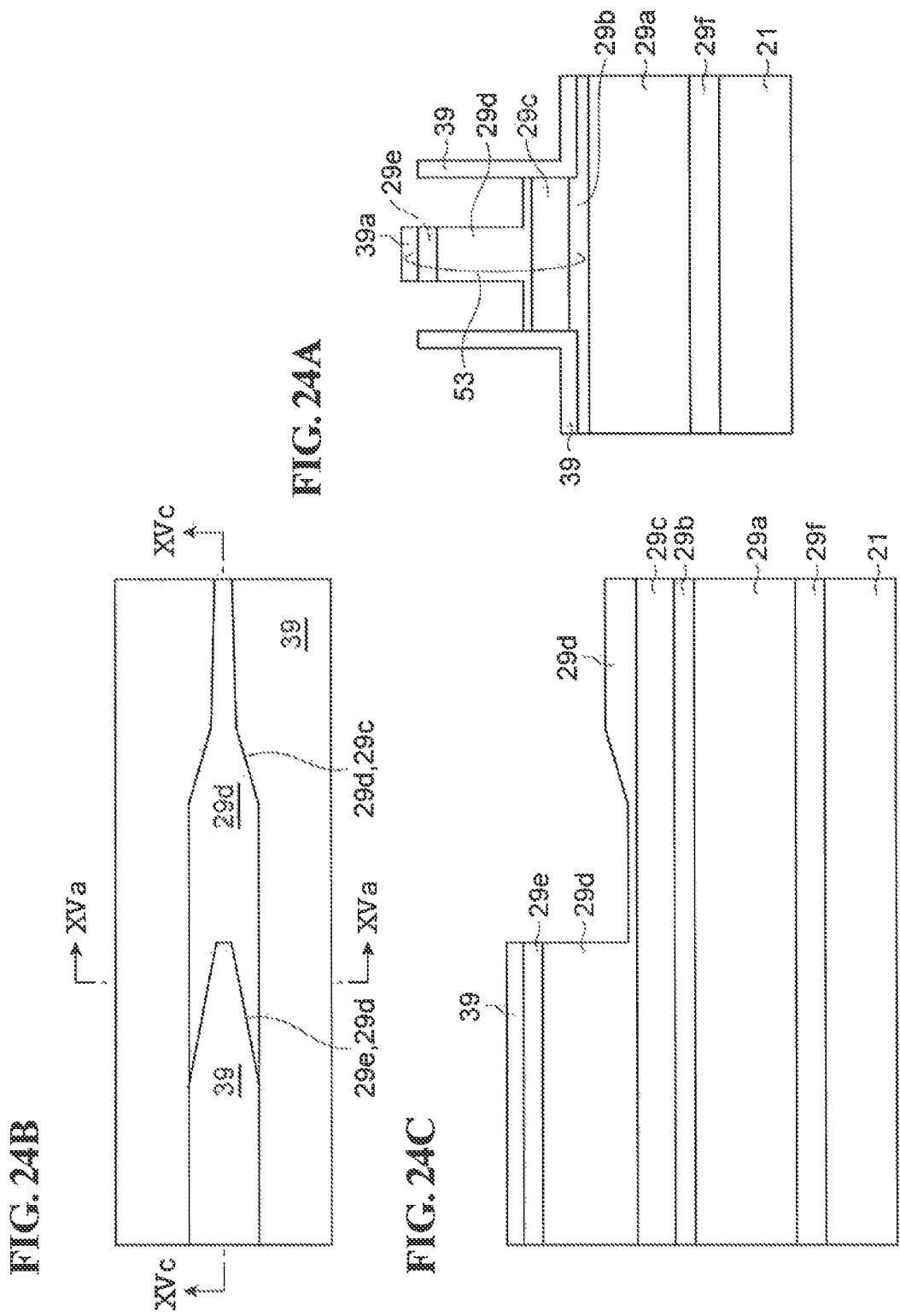

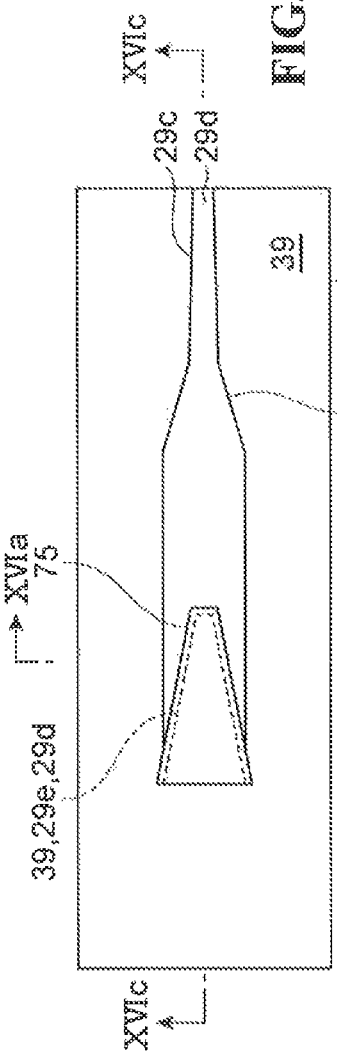
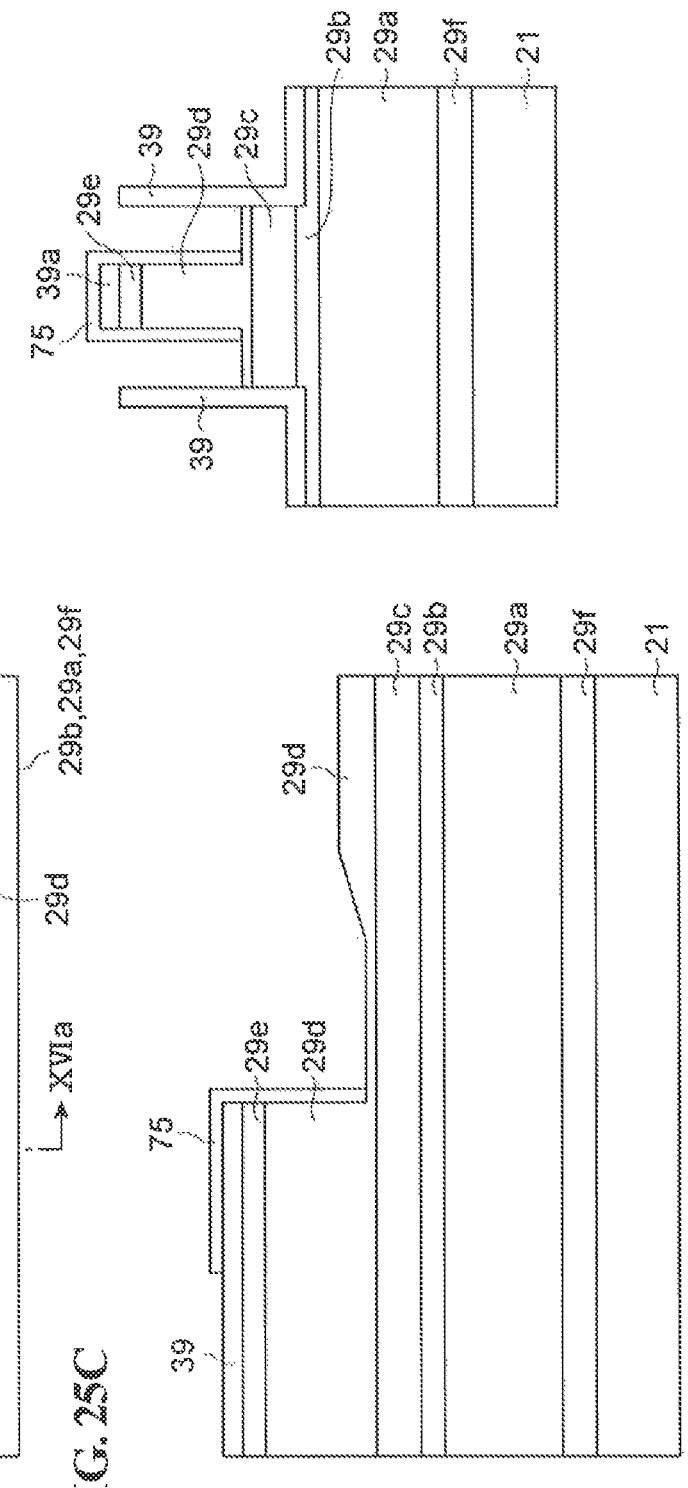
FIG. 25B
FIG. 25C
FIG. 25A

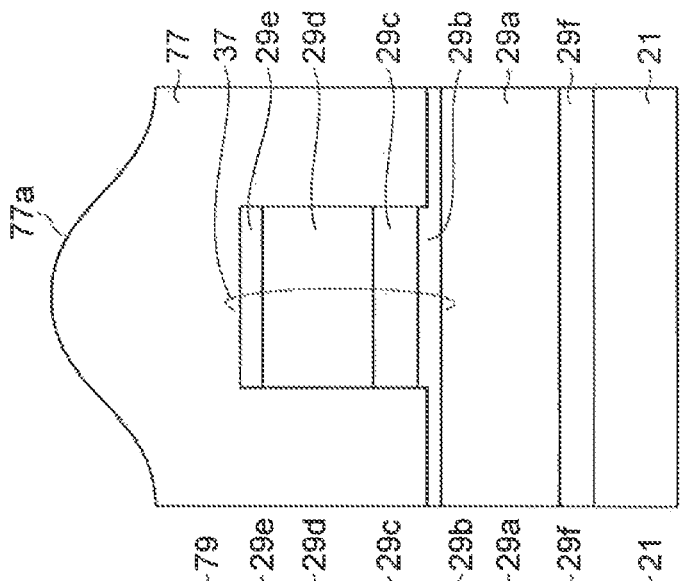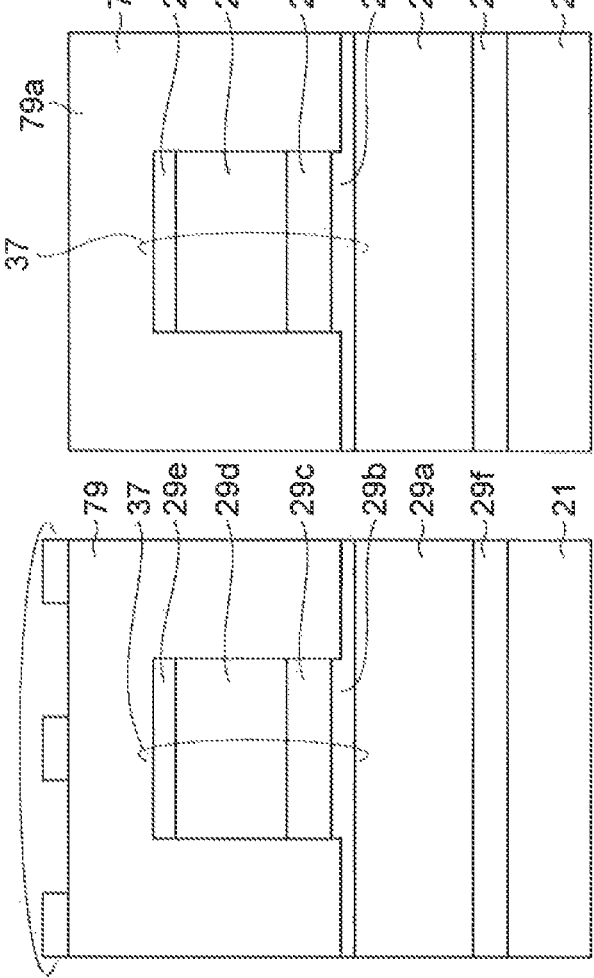

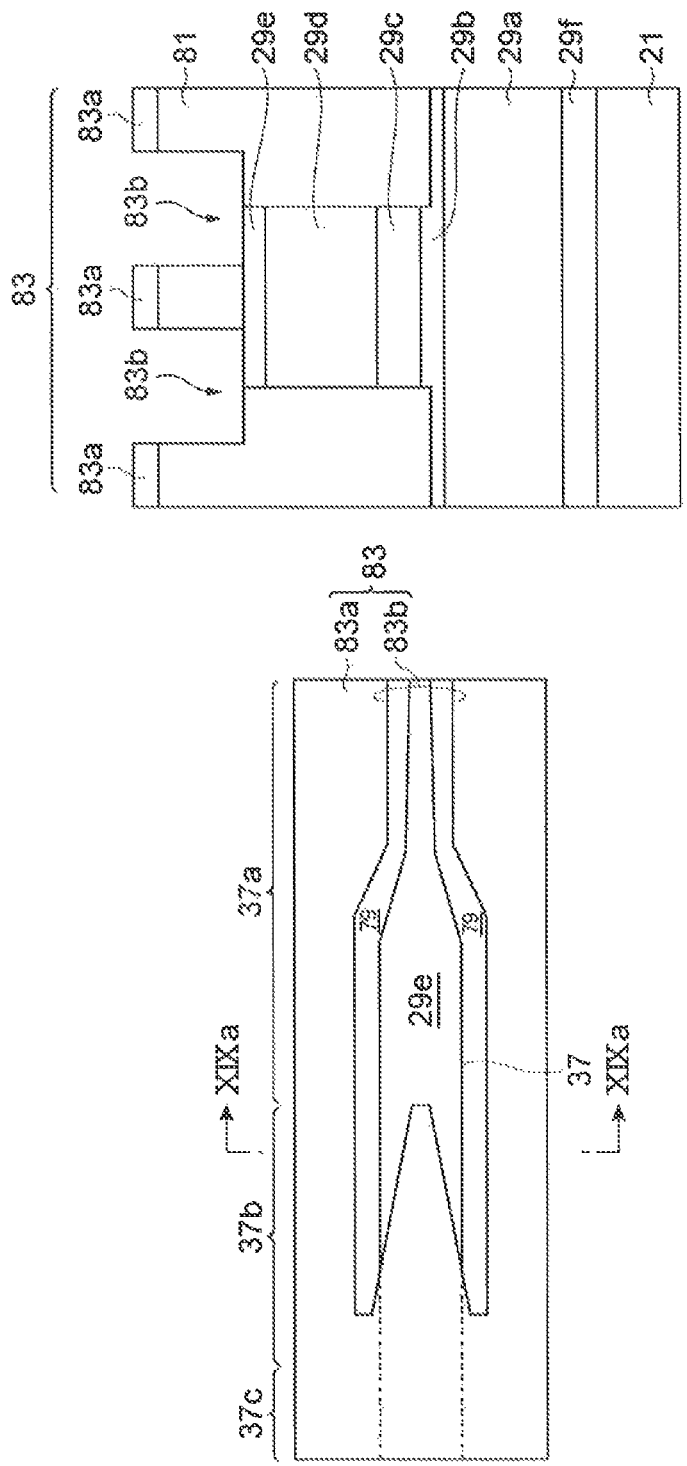

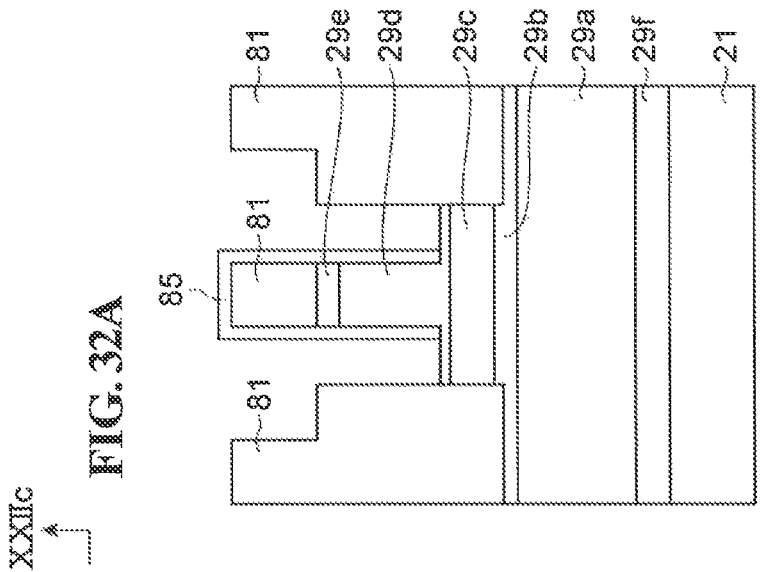
FIG. 32A
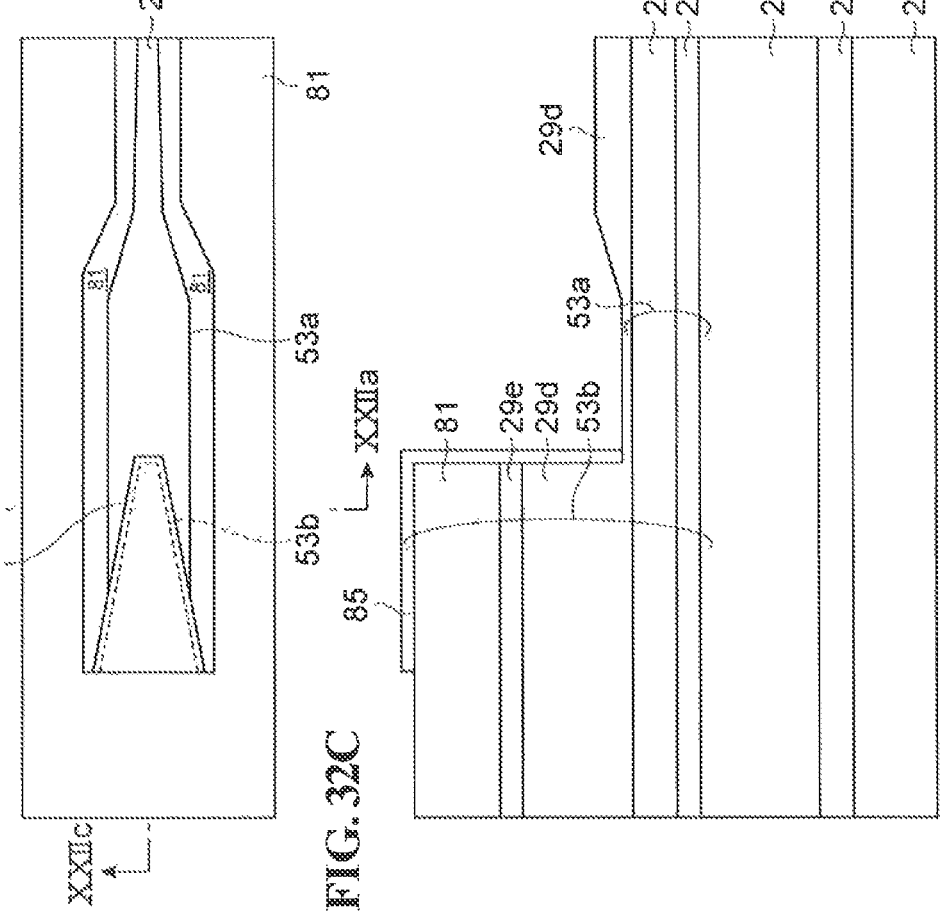
FIG. 32B
FIG. 32C

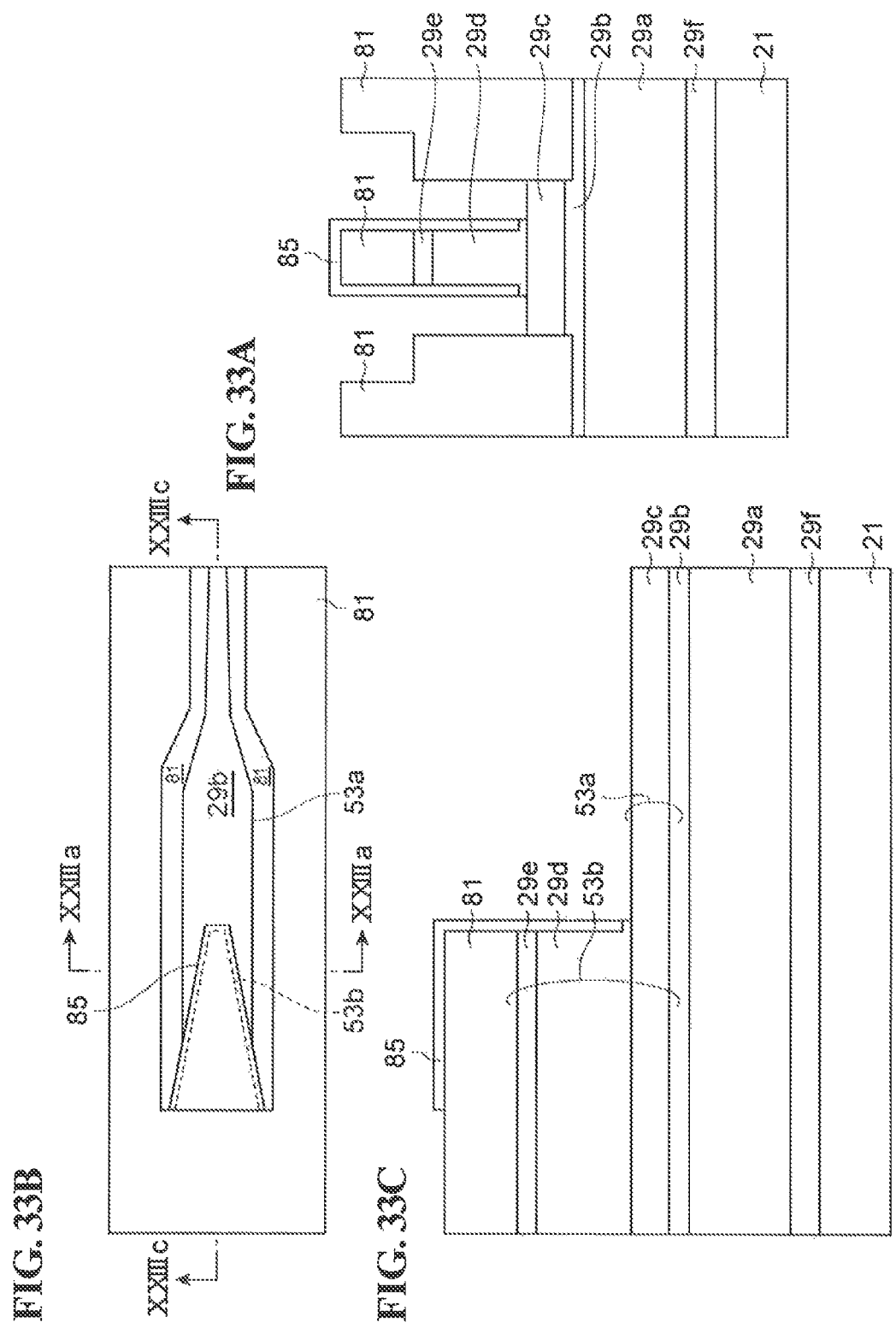

METHOD FOR MANUFACTURING SEMICONDUCTOR OPTICAL WAVEGUIDE DEVICE, AND SEMICONDUCTOR OPTICAL WAVEGUIDE DEVICE

BACKGROUND OF THE INVENTION

1. Field of the Invention

The present invention relates to a method for manufacturing a semiconductor optical waveguide device and to a semiconductor optical waveguide device.

2. Description of the Related Art

U.S. Pat. No. 6,310,995 (Patent Literature 1) discloses a spot size converter.

Spot size converters have various structures. For example, a spot size converter described in Patent Literature 1 includes a plurality of optical waveguide structures that are stacked on a substrate. At the spot size converter, light propagating through one of the optical waveguide structure is transferred to another optical waveguide structure.

In the spot size converter described in Patent Literature 1, a stacked semiconductor layer for forming the optical waveguide structures is formed in a single step of epitaxial layer growth. A plurality of waveguide mesas is formed from the stacked semiconductor layer to obtain the corresponding optical waveguide structures. For example, the spot size converter includes a semiconductor optical waveguide having a large mode filed diameter to optically couple to a single-mode optical waveguide (for example, an optical fiber). In addition, the spot size converter also includes a single-mode semiconductor optical waveguide having a small mode field diameter in which light having a single mode propagates.

SUMMARY OF THE INVENTION

A semiconductor device will be specifically described below with reference to Patent Literature 1. The waveguide structures include an upper semiconductor mesa, an intermediate semiconductor mesa, and a lower semiconductor mesa. The lower semiconductor mesa is optically coupled to a single-mode optical waveguide, such as an optical fiber. The upper semiconductor mesa and the intermediate semiconductor mesa constitute an optical waveguide that is included in the semiconductor device. In the forming process, these waveguide mesas are formed by etching the stacked semiconductor layer using a plurality of etching masks. As a result, the width of the upper semiconductor mesa is different from the width of the intermediate semiconductor mesa in the optical waveguide in the semiconductor device. More specifically, in this optical waveguide, the width of a core layer of the intermediate semiconductor mesa is different from the width of a cladding layer of the upper semiconductor mesa. However, the width of the core layer of the intermediate semiconductor mesa is preferably not significantly different from the width of the cladding layer of the upper semiconductor mesa. When the upper semiconductor mesa has a small width, contact resistance between the contact layer of the upper semiconductor mesa and the electrode on the contact layer is so large that the driving voltage applying to the semiconductor device increases. When the intermediate semiconductor mesa has a large width, the semiconductor device has a large parasitic capacitance and poor high-frequency characteristics.

In a semiconductor optical waveguide device including vertically stacked optical waveguides, a vertical mesa structure that allows stable optical transition between two optical waveguide structures is required. In addition, in the fabrication process, the width of semiconductor mesas has to be adjusted in order to control the transverse mode of light propagating in the optical waveguide.

A method for manufacturing a semiconductor optical waveguide device according to a first aspect of the present invention includes the steps of (a) preparing a substrate having a principal surface, the principal surface including a first area and a second area sequentially arranged along a waveguide axis; (b) forming a stacked semiconductor layer on the principal surface of the substrate, the stacked semiconductor layer including an upper cladding layer, a first core layer, an intermediate cladding layer, and a second core layer; (c) forming a waveguide mesa having a first portion and a second portion on the first area and the second area of the substrate, respectively, by etching the stacked semiconductor layer through a first mask, the first portion and the second portion including the upper cladding layer and the first core layer; (d) forming a dummy buried region that embeds a top surface and side surfaces of the waveguide mesa; (e) forming a second mask on the dummy buried region, the second mask having an opening on the first portion of the waveguide mesa and having a pattern on the second portion of the waveguide mesa; (f) forming a third mask having an opening that reaches a top surface of the first portion of the waveguide mesa, the third mask including a dummy buried mask formed by etching the dummy buried region through the second mask; (g) forming an upper mesa having a first upper mesa portion and a second upper mesa portion on the first area and the second area of the substrate, respectively, by etching the waveguide mesa through the third mask; and, (h) after removing the third mask, forming a lower mesa including the second core layer by etching the stacked semiconductor layer, the lower mesa having a greater width than a width of the upper mesa.

A method for manufacturing a semiconductor optical waveguide device according to a second aspect of the present invention includes the steps of (a) preparing a substrate having a principal surface, the principal surface including a first area and a second area sequentially arranged along a waveguide axis; (b) forming a stacked semiconductor layer on the principal surface of the substrate, the stacked semiconductor layer including an upper cladding layer, a first core layer, an intermediate cladding layer, and a second core layer; (c) forming a waveguide mesa that has a first portion and a second portion on the first area and the second area of the substrate, respectively, by etching the stacked semiconductor layer through a first mask, the waveguide mesa including the upper cladding layer and the first core layer; (d) forming a dummy buried region that embeds a top surface and side surfaces of the waveguide mesa; (e) forming a second mask on the dummy buried region, the second mask having an opening on the first portion of the waveguide mesa and having a pattern on the second portion of the waveguide mesa; (f) forming a dummy buried mask having an opening that reaches a top surface of the first portion of the waveguide mesa by etching the dummy buried region through the second mask; (g) forming an upper mesa having a first upper mesa portion and a second upper mesa portion on the first area and the second area of the substrate, respectively, by etching the waveguide mesa through the dummy buried mask; and, (h) after removing the dummy buried mask, forming a lower mesa including the second core layer by etching the stacked semiconductor layer, the lower mesa having a greater width than a width of the upper mesa. The second core layer, the intermediate cladding layer, the first core layer, and the upper cladding layer of the stacked semiconductor layer are sequentially disposed on the second area of the principal surface of the substrate.

A semiconductor optical waveguide device according to a third aspect of the present invention includes (a) a substrate having a principal surface, the principal surface including a first area and a second area arranged along a waveguide axis; (b) an upper mesa including a first upper mesa portion and a second upper mesa portion on the first area and the second area, respectively, the upper mesa including a first core layer; and (c) a lower mesa between the substrate and the upper mesa, the lower mesa including a second core layer, the lower mesa having a larger width than a width of the upper mesa, the lower mesa having an end surface configured to be optically coupled to an external optical waveguide. The first core layer of the upper mesa and the second core layer of the lower mesa on the second area are optically coupled through an intermediate cladding layer disposed between the first core layer and the second core layer. The upper mesa includes an upper cladding layer on the first core layer on the second area and includes no upper cladding layer on the first core layer on the first area. In addition, the first core layer of the upper mesa on the first area includes a portion that has a smaller width than a width of the first core layer on the second area and a portion that has the same width as the first core layer on the second area.

BRIEF DESCRIPTION OF THE DRAWINGS

FIGS. 2A and 2B are schematic views of a main step of a method for manufacturing a semiconductor optical waveguide device according to a first embodiment.

FIGS. 3A, 3B, and 3C are schematic views of a main step of a method for manufacturing a semiconductor optical waveguide device according to the first embodiment.

FIGS. 5A, 5B, and 5C are schematic views of a main step of a method for manufacturing a semiconductor optical waveguide device according to the first embodiment.

FIGS. 7A, 7B, and 7C are schematic views of a main step of a method for manufacturing a semiconductor optical waveguide device according to the first embodiment.

FIGS. 8A and 8B are schematic views of a main step of a method for manufacturing a semiconductor optical waveguide device according to the first embodiment.

FIGS. 9A and 9B are schematic views of a main step of a method for manufacturing a semiconductor optical waveguide device according to the first embodiment.

FIGS. 11A, 11B, and 11C are schematic views of a main step of a method for manufacturing a semiconductor optical waveguide device according to the first embodiment.

FIGS. 12A, 12B, and 12C are schematic views of a main step of a method for manufacturing a semiconductor optical waveguide device according to the first embodiment.

FIGS. 13A, 13B, and 13C are schematic views of a main step of a method for manufacturing a semiconductor optical waveguide device according to the first embodiment.

FIGS. 14A, 14B, and 14C are schematic views of a main step of a method for manufacturing a semiconductor optical waveguide device according to the first embodiment.

FIGS. 16A, 16B, and 16C are schematic views of a main step of a method for manufacturing a semiconductor optical waveguide device according to the first embodiment.

FIGS. 18A, 18B, and 18C are schematic views of a main step of a method for manufacturing a semiconductor optical waveguide device according to the first embodiment.

FIGS. 19A, 19B, and 19C are schematic views of a main step of a method for manufacturing a semiconductor optical waveguide device according to the first embodiment.

FIGS. 22A, 22B, and 22C are schematic views of a main step of a method for manufacturing a semiconductor optical waveguide device according to a second embodiment.

FIGS. 23A, 23B, and 23C are schematic views of a main step of a method for manufacturing a semiconductor optical waveguide device according to the second embodiment.

FIGS. 24A, 24B, and 24C are schematic views of a main step of a method for manufacturing a semiconductor optical waveguide device according to the second embodiment.

FIGS. 25A, 25B, and 25C are schematic views of a main step of a method for manufacturing a semiconductor optical waveguide device according to the second embodiment.

FIGS. 28A, 28B, and 28C are schematic views of a main step of a method for manufacturing a semiconductor optical waveguide device according to a third embodiment.

FIGS. 29A and 29B are schematic views of a main step of a method for manufacturing a semiconductor optical waveguide device according to the third embodiment.

FIGS. 32A, 32B, and 32C are schematic views of a main step of a method for manufacturing a semiconductor optical waveguide device according to the third embodiment.

FIGS. 33A, 33B, and 33C are schematic views of a main step of a method for manufacturing a semiconductor optical waveguide device according to the third embodiment.

DESCRIPTION OF THE PREFERRED EMBODIMENTS

Figure 1:
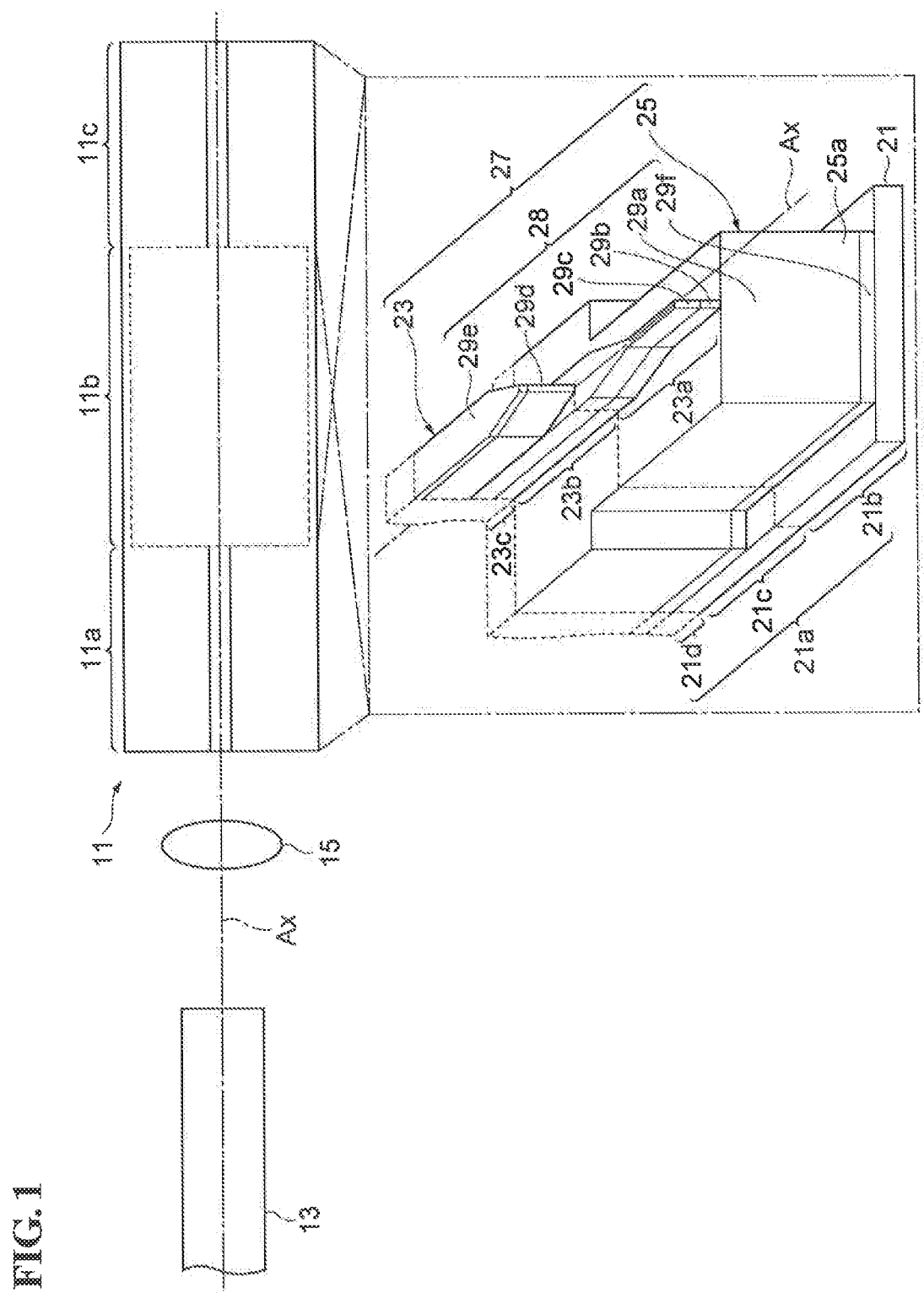
FIG. 1 is a schematic view of a semiconductor optical waveguide device according to an embodiment of the present invention.

Embodiments of the present invention will be described below.

A method for manufacturing a semiconductor optical waveguide device according to an embodiment includes the steps of (a) preparing a substrate having a principal surface, the principal surface including a first area and a second area sequentially arranged along a waveguide axis; (b) forming a stacked semiconductor layer on the principal surface of the substrate, the stacked semiconductor layer including an upper cladding layer, a first core layer, an intermediate cladding layer, and a second core layer; (c) forming a waveguide mesa having a first portion and a second portion on the first area and the second area of the substrate, respectively, by etching the stacked semiconductor layer through a first mask, the first portion and the second portion including the upper cladding layer and the first core layer; (d) forming a dummy buried region that embeds a top surface and side surfaces of the waveguide mesa; (e) forming a second mask on the dummy buried region, the second mask having an opening on the first portion of the waveguide mesa and having a pattern on the second portion of the waveguide mesa; (f) forming a third mask having an opening that reaches a top surface of the first portion of the waveguide mesa, the third mask including a dummy buried mask formed by etching the dummy buried region through the second mask; (g) forming an upper mesa having a first upper mesa portion and a second upper mesa portion on the first area and the second area of the substrate, respectively, by etching the waveguide mesa through the third mask; and, (h) after removing the third mask, forming a lower mesa including the second core layer by etching the stacked semiconductor layer, the lower mesa having a greater width than a width of the upper mesa. In addition, the second core layer, the intermediate cladding layer, the first core layer, and the upper cladding layer of the stacked semiconductor layer are sequentially disposed on the principal surface of the substrate.

In the method for manufacturing a semiconductor optical waveguide device, after the waveguide mesa including the upper cladding layer and the first core layer is formed, the top surface and side surfaces of the waveguide mesa are embedded in the dummy buried region. The second mask is then formed on the dummy buried region. The second mask has an opening on the first portion of the waveguide mesa. In addition, the second mask has an opening and a pattern on the second portion of the waveguide mesa. The second mask can be formed on a substantially flat surface of the dummy buried region. This can improve the patterning precision of the second mask.

The dummy buried region is etched through the second mask to form the third mask. The third mask includes the dummy buried mask to which the pattern of the second mask is transferred. The third mask has an opening that reaches the top surface of the first portion of the waveguide mesa.

The upper mesa having a shape defined by the mask pattern on the first portion and the second portion is formed by etching a semiconductor region from the top surface of the waveguide mesa to the inside or bottom of the upper cladding layer through the third mask. The upper mesa includes the upper cladding layer and the first core layer.

After the upper mesa is formed, the remaining lower stacked semiconductor layer is etched to form the lower mesa, which includes the second core layer. The lower mesa has a larger width than a width of the upper mesa. Thus, an optical waveguide in the lower mesa has a greater mode field diameter than that of an optical waveguide in the upper mesa.

In this manufacturing method, the upper mesa and the lower mesa are vertically arranged in a direction perpendicular to the principal surface of the substrate. The second core layer, the intermediate cladding layer, the first core layer, and the upper cladding layer of the stacked semiconductor layer are sequentially arranged on the principal surface of the substrate. Thus, the first core layer of the upper mesa is optically coupled to the second core layer of the lower mesa through the intermediate cladding layer. Thus, a semiconductor optical waveguide device that includes a stacked semiconductor layer including vertically arranged core layers may be provided.

A manufacturing method according an embodiment may further include a step of, after forming the waveguide mesa, forming an inorganic insulating layer on the substrate so as to cover the top surface and side surfaces of the waveguide mesa. The dummy buried region may be formed on the inorganic insulating layer by coating. In the step of forming the opening in the dummy buried region, the inorganic insulating layer on the top surfaces of the first portion and the second portion of the waveguide mesa may be etched through the second mask to form an insulating layer mask. The insulating layer mask may cover the side surfaces of the waveguide mesa. In addition, the dummy buried region may be made of a material different from the inorganic insulating layer.

In this manufacturing method, the inorganic insulating layer is formed before the dummy buried region is formed by coating. Thus, the surface of the waveguide mesa is protected from the material of the dummy buried region.

In a manufacturing method according to an embodiment, the inorganic insulating layer may include a silicon inorganic insulating layer. For example, the silicon inorganic insulating layer contains silicon nitride (SiN), silicon oxide ($SiO_2$), and/or silicon oxynitride (SiON).

In this manufacturing method, before the dummy buried region is formed, the top surface and side surfaces of the waveguide mesa is covered with the silicon inorganic insulating layer. During the processing of the inorganic insulating layer, the inorganic insulating layer on the side surfaces of the waveguide mesa is covered with the dummy buried mask. Thus, the insulating layer mask is formed by transferring the pattern of the dummy buried mask to the inorganic insulating layer. The third mask includes the insulating layer mask, and the insulating layer mask is removed when the third mask is removed.

In a manufacturing method according to an embodiment, the second mask may include a first mask portion having a pattern that has a smaller width than a width of the second portion of the waveguide mesa and a second mask portion having a pattern that has a greater width than the width of the second portion of the waveguide mesa. After etching through the third mask, the second upper mesa portion of the upper mesa may have a taper-shaped structure formed by processing the second portion of the waveguide mesa, the taper-shaped structure having a width that changes monotonously along the waveguide axis.

In this manufacturing method, depending on the mask pattern, a mesa structure having substantially the same width as the waveguide mesa and a mesa structure having a smaller width than the waveguide mesa are simultaneously formed by combinations of the pattern width of the second mask and the waveguide mesa width.

In a manufacturing method according to an embodiment, the dummy buried region may be made of benzocyclobutene resin, fluorine-based resin, spin-on-glass, or tin-doped indium oxide. The second mask may include a resist mask. In addition, the opening of the third mask may have a larger width than a width of the second portion of the waveguide mesa on the first area. In this manufacturing method, the dummy buried region is made of benzocyclobutene (BCB) resin, fluorine-based resin, spin-on-glass, or tin-doped indium oxide. Thus, the dummy buried region may be formed by coating because these materials are used for the dummy buried region.

In a manufacturing method according to an embodiment, the step of forming the dummy buried region may include a step of applying a resin and a step of baking the resin to form a resin body. The dummy buried region may contain cured resist. The second mask may include a resist mask. In addition, the opening of the third mask may have a larger width than a width of the second portion of the waveguide mesa on the first area. In this manufacturing method, the dummy buried region formed of the material described above is formed by coating. The dummy buried region formed by coating can reduce the effect of a difference in level of the underlying waveguide mesa on the dummy buried region. Thus, the dummy buried region has a flat surface.

A method for manufacturing a semiconductor optical waveguide device according to another embodiment includes the steps of (a) preparing a substrate having a principal surface, the principal surface including a first area and a second area sequentially arranged along a waveguide axis; (b) forming a stacked semiconductor layer on the principal surface of the substrate, the stacked semiconductor layer including an upper cladding layer, a first core layer, an intermediate cladding layer, and a second core layer; (c) forming a waveguide mesa that has a first portion and a second portion on the first area and the second area of the substrate, respectively, by etching the stacked semiconductor layer through a first mask, the waveguide mesa including the upper cladding layer and the first core layer; (d) forming a dummy buried region that embeds a top surface and side surfaces of the waveguide mesa; (e) forming a second mask on the dummy buried region, the second mask having an opening on the first portion of the waveguide mesa and having a pattern on the second portion of the waveguide mesa; (f) forming a dummy buried mask having an opening that reaches a top surface of the first portion of the waveguide mesa by etching the dummy buried region through the second mask; (g) forming an upper mesa having a first upper mesa portion and a second upper mesa portion on the first area and the second area of the substrate, respectively, by etching the waveguide mesa through the dummy buried mask; and, (h) after removing the dummy buried mask, forming a lower mesa including the second core layer by etching the stacked semiconductor layer, the lower mesa having a greater width than a width of the upper mesa. The second core layer, the intermediate cladding layer, the first core layer, and the upper cladding layer of the stacked semiconductor layer are sequentially disposed on the second area of the principal surface of the substrate.

In this method for manufacturing a semiconductor optical waveguide device, after the waveguide mesa including the first core layer is formed, the top surface and side surfaces of the waveguide mesa are embedded in the dummy buried region. The second mask is formed on the dummy buried region. The second mask has an opening on the first portion of the waveguide mesa. In addition, the second mask has an opening and a pattern on the second portion of the waveguide mesa. The dummy buried region has a substantially flat surface. The second mask formed on the flat surface of the dummy buried region can have improved patterning precision.

The dummy buried region is etched through the second mask to form the dummy buried mask to which the pattern of the second mask is transferred. The dummy buried mask has an opening that reaches the top surface of the first portion of the waveguide mesa and an opening and a pattern on the top surface of the second portion of the waveguide mesa. The waveguide mesa is etched through the dummy buried mask to form the upper mesa. The upper mesa is defined by the mask pattern on the second portion and by the shape of the waveguide mesa. The second upper mesa portion of the upper mesa includes the upper cladding layer and the first core layer. The first upper mesa portion includes the first core layer. After the upper mesa is formed, the remaining stacked semiconductor layer is processed to form the lower mesa, which includes the second core layer. The lower mesa has a larger width than a width of the upper mesa. Thus, an optical waveguide in the lower mesa has a greater mode field diameter than that of an optical waveguide in the upper mesa.

In this manufacturing method, the upper mesa and the lower mesa are vertically arranged in a direction perpendicular to the principal surface of the substrate. The second core layer, the intermediate cladding layer, the first core layer, and the upper cladding layer of the stacked semiconductor layer are sequentially arranged in the direction perpendicular to the principal surface of the substrate. Thus, the first core layer of the upper mesa is optically coupled to the second core layer of the lower mesa through the intermediate cladding layer. Thus, a semiconductor optical waveguide device that includes a stacked semiconductor layer including vertically arranged core layers can be provided.

In a manufacturing method according to another embodiment, the dummy buried region may include a TEOS oxide film. The step of forming the dummy buried region may include a step of forming a TEOS oxide film that embeds the top surface and the side surfaces of the waveguide mesa and a step of flattening the TEOS oxide film.

In this manufacturing method, the TEOS oxide film in the dummy buried region has a surface profile that corresponds to the shape of the underlying waveguide mesa. After the TEOS oxide film is formed, the TEOS oxide film is flattened to form the dummy buried region in the subsequent step. Thus, the second mask is formed on the substantially flat surface of the dummy buried region.

In a manufacturing method according to another embodiment, the step of forming the dummy buried region may include a step of forming an inorganic insulating layer on the substrate so as to cover the top surface and side surfaces of the waveguide mesa after the waveguide mesa is formed, and a step of applying a material that embeds the top surface and side surfaces of the waveguide mesa.

In this manufacturing method, the dummy buried region formed by applying the material for embedding the top surface and side surfaces of the waveguide mesa has a substantially flat surface.

A semiconductor optical waveguide device according to an embodiment includes (a) a substrate having a principal surface, the principal surface including a first area and a second area arranged along a waveguide axis; (b) an upper mesa including a first upper mesa portion and a second upper mesa portion on the first area and the second area, respectively, the upper mesa including a first core layer; and (c) a lower mesa between the substrate and the upper mesa, the lower mesa including a second core layer, the lower mesa having a larger width than a width of the upper mesa, the lower mesa having an end surface configured to be optically coupled to an external optical waveguide. The first core layer of the upper mesa and the second core layer of the lower mesa on the second area are optically coupled through an intermediate cladding layer disposed between the first core layer and the second core layer. The upper mesa includes an upper cladding layer on the first core layer on the second area and includes no upper cladding layer on the first core layer on the first area. In addition, the first core layer of the upper mesa on the first area includes a portion that has a smaller width than a width of the first core layer on the second area and a portion that has the same width as the first core layer on the second area.

In a semiconductor optical waveguide device according to an embodiment, the principal surface of the substrate may further include a third area. The upper mesa may further include a third upper mesa portion on the third area, the third upper mesa portion being optically coupled to the second upper mesa portion. The lower mesa and the first and second upper mesa portions of the upper mesa may constitute a spot size converter. In addition, the third upper mesa portion on the third area may include a semiconductor device that is coupled to the spot size converter.

In this semiconductor optical waveguide device, the width of the first core layer of the first upper mesa portion is different from the width of the first core layer of the second upper mesa portion. In such a structure, the upper mesa guides light propagating in the first upper mesa portion during vertical optical transition between the upper mesa and the lower mesa. More specifically, with respect to transition from the upper mesa to the lower mesa, because the narrow first core layer on the first area results in a lower refractive index in a region on the top surface of the second core layer than in a region on the top surface of the first core layer of the second upper mesa portion, this promotes optical transition from the first core layer of the upper mesa to the second core layer of the lower mesa. On the other hand, with respect to transition from the lower mesa to the upper mesa, because the narrow first core layer on the first area results in a higher refractive index in a region on the top surface of the second core layer than in a waveguide structure having the single second core layer on the entire first area, this promotes optical transition from the second core layer of the lower mesa to the first core layer of the upper mesa.

The first upper mesa portion on the first area includes no upper cladding layer, and the second upper mesa portion on the second area includes an upper cladding layer. With respect to light propagating along the waveguide axis, by forming the upper cladding layer, optical coupling between the upper mesa and the lower mesa is effectively obtained. More specifically, with respect to optical transition from the lower mesa to the upper mesa in the light propagation direction in this optical transition (that is, in the direction from the first area to the second area), because the arrangement of the upper mesa that includes no upper cladding layer on the first area and includes an upper cladding layer on the second area results in a higher refractive index in a region on the top surface of the first core layer on the second area than in a region on the first core layer on the first area, this promotes optical transition associated with light propagating along the waveguide axis in the direction from the lower mesa to the upper mesa. On the other hand, with respect to optical transition from the upper mesa to the lower mesa in the light propagation direction in this optical transition (that is, in the direction from the second area to the first area), because the arrangement of the upper mesa that includes an upper cladding layer on the second area and includes no upper cladding layer on the first area results in a lower refractive index in a region on the top surface of the first core layer on the first area than in a region on the first core layer on the second area, this promotes optical transition in the direction from the upper mesa to the lower mesa.

A spot size converter having such a structure includes a stacked semiconductor layer including a plurality of vertically arranged core layers and has good transition characteristics.

An upper cladding layer having a varying width on the second area in the direction from one of the first area and the second area to the other guides optical coupling between the upper mesa and the lower mesa. With respect to optical transition from the lower mesa to the upper mesa, because an upper cladding layer having an increasing width in the light propagation direction in this optical transition (that is, in the direction from the first area to the second area) results in an increasing refractive index in the light propagation direction in a region on the top surface of the first core layer on the second area relative to a region on the first core layer on the first area, this promotes optical transition associated with light propagating along the waveguide axis in the direction from the lower mesa to the upper mesa. On the other hand, with respect to optical transition from the upper mesa to the lower mesa, because an upper cladding layer having a decreasing width in the light propagation direction in this optical transition (that is, in the direction from the second area to the first area) results in a decreasing refractive index in the light propagation direction in a region on the top surface of the first core layer on the first area relative to a region on the first core layer on the second area, this promotes optical transition in the direction from the upper mesa to the lower mesa.

A method for manufacturing a semiconductor optical waveguide device and a semiconductor optical waveguide device according to an embodiment of the present invention will be described below with reference to the accompanying drawings. Like reference numerals denote like parts throughout the figures.

First Embodiment

FIG. 1 is a schematic view of a semiconductor optical waveguide device according to the present embodiment. A semiconductor optical waveguide device 11 includes a spot size converter 11a, an optical waveguide device 11b, and a spot size converter 11c. The spot size converter 11a, the optical waveguide device 11b, and the spot size converter 11c are formed on a single semiconductor substrate. The spot size converter 11a is optically coupled to one end of the optical waveguide device 11b. The spot size converter 11c is optically coupled to the other end of the optical waveguide device 11b. For example, the optical waveguide device 11b includes a Mach-Zehnder optical modulator and a photodiode (PD) integrated with a 90-degree hybrid. One end surface of the spot size converter 11a is optically coupled to an optical waveguide device (hereinafter referred to as an optical waveguide device 13), such as an optical fiber. If necessary, a lens 15 may be used for optically coupling the spot size converter 11a of the semiconductor optical waveguide device 11 to the optical waveguide device 13. The spot size converter 11a will be further described below. The spot size converter 11c has the same structure as the spot size converter 11a.

The spot size converter 11a includes a substrate 21, an upper mesa 23, and a lower mesa 25. The optical waveguide device 11b includes the substrate 21 and the upper mesa 23. The substrate 21 has a principal surface 21a. The principal surface 21a includes a first area 21b, a second area 21c, and a third area 21d. The upper mesa 23 is disposed on the lower mesa 25. The lower mesa 25 is disposed on the principal surface 21a of the substrate 21. The lower mesa 25 is has a larger width than a width of the upper mesa 23. The lower mesa 25 has an end surface 25a that is optically coupled to an optical waveguide such as a single-mode optical fiber. The lower mesa 25 is disposed on the first area 21b and the second area 21c of the substrate 21. The upper mesa 23 includes a first upper mesa portion 23a, a second upper mesa portion 23b, and a third upper mesa portion 23c. The first upper mesa portion 23a, the second upper mesa portion 23b, and the third upper mesa portion 23c are disposed on the first area 21b, the second area 21c, and the third area 21d of the substrate 21, respectively.

A stacked semiconductor layer 28 configured to constitute a stacked mesa layer 27 is disposed on the principal surface 21a of the substrate 21. The stacked mesa layer 27 includes the upper mesa 23 and the lower mesa 25. The stacked semiconductor layer 28 includes a second core layer 29a, an intermediate cladding layer 29b, a first core layer 29c, and an upper cladding layer 29d on the second area 21c. In addition, the stacked semiconductor layer 28 may further includes a contact layer 29e and a buffer layer 29f. The first upper mesa portion 23a and the second upper mesa portion 23b are arranged along a waveguide axis Ax. The first upper mesa portion 23a is coupled to one end of the second upper mesa portion 23b. The third upper mesa portion 23c is optically coupled to the other end of the second upper mesa portion 23b. The third upper mesa portion 23c on the third area 21d has a stacked semiconductor layer structure, which constitutes the optical waveguide device (semiconductor device) 11b optically coupled to the spot size converter 11a (11c). In the present embodiment, the stacked semiconductor layer structure constituting the optical waveguide device on the third area 21d has the same structure as the stacked semiconductor layer 28.

The upper mesa 23 includes the first core layer 29c. The lower mesa 25 includes the second core layer 29a. The lower mesa 25 is disposed between the substrate 21 and the upper mesa 23. The first core layer 29c of the upper mesa 23 is optically coupled to the second core layer 29a of the lower mesa 25 through the intermediate cladding layer 29b so that an optical transition between the first core layer 29c and the second core layer 29a occurs in the spot size converter 11a (11c).

The second upper mesa portion 23b includes the intermediate cladding layer 29b, the first core layer 29c, and the upper cladding layer 29d. The first upper mesa portion 23a includes the intermediate cladding layer 29b and the first core layer 29c. The stacked mesa layer 27 on the first area 21b includes the second core layer 29a, the intermediate cladding layer 29b, the first core layer 29c, and the upper cladding layer 29d. These semiconductor layers (29a, 29b, 29c, 29d) are sequentially disposed on the substrate 21. The stacked mesa layer 27 on the second area 21c includes the second core layer 29a, the intermediate cladding layer 29b, the first core layer 29c, and the upper cladding layer 29d. These semiconductor layers (29a, 29b, 29c, 29d) are sequentially disposed on the substrate 21. In the present embodiment, the second upper mesa portion 23b includes a straight-shaped waveguide portion in which the first core layer 29c has substantially the same width as the upper cladding layer 29d. The upper mesa 23 includes a taper-shaped structure in which a width of the first core layer 29c on the first area 21b decreases gradually relative to the first core layer 29c on the second area 21c in a direction of the waveguide axis Ax. The taper-shaped structure is coupled to a stripe-shaped structure having a smaller width than a width of the first core layer 29c on the second area 21c. This stripe-shaped structure is disposed on the first area 21b and extends from the taper-shaped structure to an end portion of the spot size converter 11a (11c) in the direction of the waveguide axis Ax. If necessary, the stripe-shaped structure may be terminated at any position between the end portion and the taper-shaped structure.

Preferably, the upper cladding layer 29d at a boundary portion between the second upper mesa portion 23b and the first upper mesa portion 23a has a smaller width than a width of the first core layer 29c disposed directly under the upper cladding layer 29d. The width of the upper cladding layer 29d gradually approaches the width of the first core layer 29c in the direction from the first area 21b to the second area 21c. In the second upper mesa portion 23b coupled to the first upper mesa portion 23a, the first core layer 29c has the same width as the upper cladding layer 29d. When the upper cladding layer 29d in the second area 21c has the same mesa width as the first core layer 29c, the first core layer 29c stably confines light therein. Thus, light propagates stably through the first core layer 29c in the upper mesa 23. In addition, in this case, the parasitic capacitance of a modulator portion decreases. Thus, the optical waveguide device including the optical modulator has high frequency modulation characteristics and a wide modulation bandwidth.

In the semiconductor optical waveguide device 11, the second upper mesa portion 23b includes the upper cladding layer 29d. The first upper mesa portion 23a does not include the upper cladding layer 29d. The first core layer 29c of the first upper mesa portion 23a includes a portion having a smaller width than that of the first core layer 29c of the second upper mesa portion 23b, and the first core layer 29c of the first upper mesa portion 23a includes another portion having the same width as the first core layer 29c of the second upper mesa portion 23b. This structure allows the first core layer 29c on the first area 21b to guide light through the first upper mesa portion 23a when the optical transition between the upper mesa 23 and the lower mesa 25 occurs in a vertical direction (a direction perpendicular to the principal surface of the substrate). More specifically, the following structure allows effective transition of propagating light from the upper mesa 23 to the lower mesa 25. As mentioned above, in the semiconductor optical waveguide device 11, the second upper mesa portion 23b has the upper cladding layer 29d disposed on a top surface of the first core layer 29c in the second area 21c. On the other hand, the first upper mesa portion 23a does not include the upper cladding layer 29d on the first core layer 29c in the first area 21b. In this structure, the first upper mesa portion 23a has a portion having a lower refractive index on the first core layer 29c compared with a refractive index of a portion on the first core layer 29c of the second upper mesa portion 23b. Accordingly, in the second upper mesa portion 23b, light is distributed from the first core layer 29c into the upper cladding layer 29d. In the first upper mesa portion 23a, light is strongly confined into the first core layer 29c and light is not distributed in a region on the first core layer 29c. Thus, distribution of light is changed between the first upper mesa portion 23a and the second upper mesa portion 23b when light propagates from the second upper mesa portion 23b to the first upper mesa portion 23a. In addition, the first core layer 29c in the first area 21b has a smaller width than a width of the first core layer 29c on the second area 21c. Due to this structure, the first upper mesa portion 23a has a portion having a lower refractive index on the second core layer 29a compared with a refractive index of a portion on the first core layer 29c of the second upper mesa portion 23b. Accordingly, distribution of the refractive index is also changed between the first upper mesa portion 23a and the second upper mesa portion 23b due to the change of the width of the first core layer 29c described above. As a result, the distribution of light that propagates through the first core layer 29c of the second upper mesa portion 23b toward the first upper mesa portion 23a shifts from the first core layer 29c to the second core layer 29a of the lower mesa 25. This causes optical transition from the first core layer 29c of the upper mesa 23 to the second core layer 29a of the lower mesa 25.

Likewise, the following structure allows transition of guided light from the lower mesa 25 to the upper mesa 23. More specifically, the first core layer 29c having the small width is disposed on the second core layer 29a in the first area 21b. The first core layer 29c of the second upper mesa portion 23b in the second area 21c has a larger width than a width of the first core layer 29c in the first area 21b. Accordingly, the second upper mesa portion 23b has a portion having a larger refractive index on the second core layer 29a compared with a refractive index of a portion on the second core layer 29a of the lower mesa 25 in the first area 21b in which the second core layer 29a is almost not covered with the first core layer 29c. In addition, the upper cladding layer 29d is disposed on the first core layer 29c in the second area 21c, and is not disposed on the first core layer 29c in the first area 21b. Accordingly, the second upper mesa portion 23b has a portion having a larger refractive index on the first core layer 29c compared with a refractive index of a portion on the first core layer 29c of the first upper mesa portion 23a. Due to this refractive index profile, light is not expanded from the first core layer 29c in the first upper mesa portion 23a. In the second upper mesa portion 23b, light propagating in the first core layer 29c is expanded into the upper cladding layer 29d. As mentioned above, the vertical profiles of the refractive indices are changed in the light propagation direction along the waveguide axis Ax. Therefore, optical transition from the lower mesa 25 to the upper mesa 23 occurs.

In particular, in the present embodiment, the upper cladding layer 29d includes a portion having a width varying in a direction from the first area 21b to the second area 21c and a portion having substantially the same width as the first core layer 29c in the second upper mesa portion 23b. The upper cladding layer 29d on the second area 21c allows optical coupling between the upper mesa 23 and the lower mesa 25 along the waveguide axis. The upper cladding layer 29d having such a structure further stabilizes transition of guided light from the lower mesa 25 to the upper mesa 23. More specifically, the upper cladding layer 29d having a width that varies up to the width of the first core layer 29c in the light propagation direction is partly disposed on the first core layer 29c. By forming such an upper cladding layer 29d on the first core layer 29c, the second upper mesa portion 23b has a portion on the first core layer 29c that has a higher refractive index than a refractive index of a portion on the first core layer 29c of the first upper mesa portion 23a. Furthermore, in the second upper mesa portion 23b, the vertical profile of the refractive index increases in the propagation direction along the waveguide axis Ax because the upper cladding layer 29d is formed on the first core layer 29c in the second area 21c. This allows stable optical transition from the lower mesa 25 to the upper mesa 23.

Similarly, the stable optical transition of guided light from the upper mesa 23 to the lower mesa 25 can be also obtained. The upper cladding layer 29d is disposed on the first core layer 29c in the second area 21c. The upper cladding layer 29d has a width varying in the light propagation direction. Specifically, the width of the upper cladding layer 29d has the same width as that of the first core layer 29c in the second area 21c and is decreased in the propagation direction from the second area 21c to the first area 21b. The upper cladding layer 29d is terminated at a boundary between the second area 21c and the first area 21b. By forming such an upper cladding layer 29d on the first core layer 29c, the first upper mesa portion 23a has a portion on the first core layer 29c that has a lower refractive index than a refractive index of a portion on the first core layer 29c of the second upper mesa portion 23b. This allows stable optical transition from the upper mesa 23 to the lower mesa 25.

The second upper mesa portion 23b of the upper mesa 23 in the second area 21c includes two waveguide portions. One of the waveguide portions of the second upper mesa portion 23b includes the upper cladding layer 29d and the first core layer 29c that have the same mesa width. Another waveguide portion of the second upper mesa portion 23b includes the upper cladding layer 29d and the first core layer 29c that have different mesa widths. When the upper cladding layer 29d has the same mesa width as the first core layer 29c, the parasitic capacitance of the modulator portion on the third area 21d decreases. As a result, the semiconductor optical waveguide device 11 has broadband modulation characteristics, for example.

In this semiconductor optical waveguide device 11, the spot size converter 11a (11c) includes a stacked semiconductor layer including a plurality of core layers that are stacked on the substrate in the thickness direction. The spot size converter 11a (11c) has a large coupling efficiency to the optical waveguide device 13 and a small optical loss for the propagating light. In addition, the spot size converter 11a (11c) has good conversion characteristics. Light propagating in the spot size converter 11a (11c) is effectively transferred between the upper mesa 23 and the lower mesa 25.

FIGS. 2A to 21C are schematic views of main steps of a method for manufacturing a semiconductor optical waveguide device according to the first embodiment. For the sake of clarity, these figures illustrate a single device area of the semiconductor optical waveguide device 11. In actual manufacture, a plurality of semiconductor optical waveguide devices is arrayed on a wafer. Referring to FIG. 2A, the stacked semiconductor layer 28 is grown on the substrate 21. For example, the stacked semiconductor layer 28 is grown by using a metal-organic vapor phase epitaxy (MOVPE) method. The stacked semiconductor layer 28 for forming the spot size converter 11a (11c) is formed on the first area 21b, the second area 21c, and the third area 21d of the substrate 21. First, an epitaxial substrate is prepared. Referring to FIG. 2B, in order to form the stacked semiconductor layer 28, in the present embodiment, for example, the buffer layer 29f, the second core layer 29a, the intermediate cladding layer 29b, the first core layer 29c, the upper cladding layer 29d, and the contact layer 29e are sequentially grown on the principal surface 21a of the substrate 21. An example of the stacked semiconductor layer 28 will be described as follows:

Substrate 21: Semi-insulating InP wafer.

Buffer layer 29f: n-type InP layer (thickness: 0.1 μm).

Second core layer 29a: Multi quantum well (MQW) structure (thickness: 5 μm) composed of n-InP layers (thickness: 50 nm) and n-InGaAsP layers (thickness: 50 nm, photoluminescence (PL) peak wavelength: 1.1 μm) alternately stacked on top of one another, with the top layer being an InGaAsP layer.

Intermediate cladding layer 29b: n-InP intermediate layer (thickness: 200 nm).

First core layer 29c: MQW structure (thickness: 500 nm) composed of AlGaInAs layers (6 nm) and AlGaInAs layers (8 nm) alternately stacked on top of one another, with the top layer being an AlInAs layer.

Upper cladding layer 29d: p-InP cladding layer (thickness: 1.25 μm).

Contact layer 29e: p-InGaAs contact layer (thickness: 150 nm).

As illustrated in FIG. 3A, an insulating layer 31 is formed on the stacked semiconductor layer 28. The insulating layer 31 includes a silicon inorganic insulating layer, for example. Also in the subsequent description, the silicon inorganic insulating layer is formed of silicon nitride (for example, SiN), silicon oxide (for example, $SiO_2$), or silicon oxynitride (for example, SiON).

As illustrated in FIGS. 3B and 3C, a resist mask 33 having a pattern that defines a mesa shape is formed on the insulating layer 31. The resist mask 33 has a second pattern 33b and a third pattern 33c. The widths of the second pattern 33b and the third pattern 33c of the resist mask 33 are determined so that the semiconductor waveguide on the second area 21c and the third area 21d has a mesa width for constituting a single-mode optical waveguide. In the present embodiment, the second pattern 33b extends on the second area 21c and the first area 21b. The resist mask 33 has a first pattern 33a that defines the taper-shaped structure on the first area 21b. The first pattern 33a has a taper-shaped pattern 33d and an optical transition guide pattern 33e, which has a width equal to or smaller than the minimum width of the taper-shaped pattern 33d.

Figure 4C:
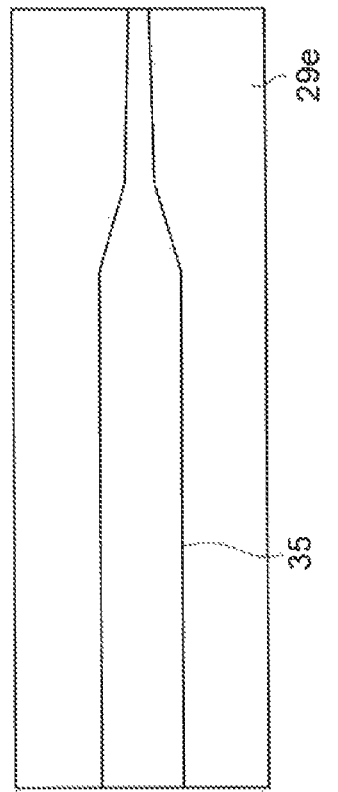
FIGS. 4A, 4B, and 4C are schematic views of a main step of a method for manufacturing a semiconductor optical waveguide device according to the first embodiment.
Figure 4A:
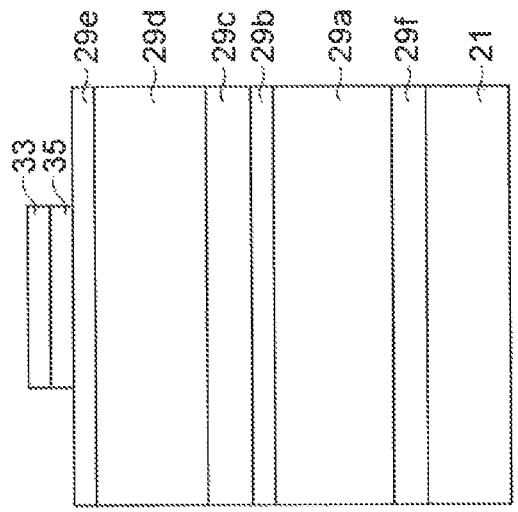
Figure 4B:
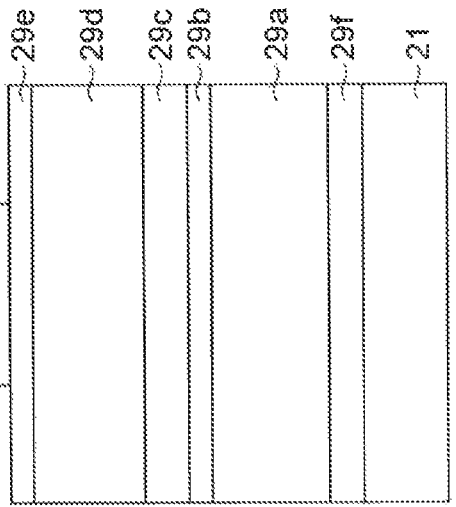

As illustrated in FIG. 4A, the insulating layer 31 is etched through the resist mask 33 to form an insulating layer mask (a first mask 35) to which the patterns of the resist mask 33 are transferred. The etching is performed by using dry etching method. As illustrated in FIGS. 4B and 4C, the resist mask 33 is removed after etching. Thus, the first mask 35 formed of the insulating layer is formed. The first mask 35 has a pattern that defines the shape of a waveguide mesa.

As illustrated in FIG. 5A, the stacked semiconductor layer 28 is dry-etched through the first mask 35 to form a waveguide mesa 37 on the principal surface 21a of the substrate 21. In the present embodiment, the stacked semiconductor layer 28 is etched to the middle of the intermediate cladding layer 29b. Thus, the intermediate cladding layer 29b is exposed on the etched surface 28a of the stacked semiconductor layer 28. As illustrated in FIG. 5B, the first mask 35 is removed. When the first mask 35 is formed of SiN, for example, a buffered hydrofluoric acid (BHF) solution is used to remove the first mask 35. As illustrated in FIG. 5C, the waveguide mesa 37 includes a first portion 37a, a second portion 37b, and a third portion 37c. The first portion 37a, the second portion 37b, and the third portion 37c are disposed on the first area 21b, the second area 21c, and the third area 21d, respectively, along the waveguide axis Ax. A top surface 37d of the waveguide mesa 37 is exposed by removal of the first mask 35. The intermediate cladding layer 29b, the first core layer 29c, the upper cladding layer 29d (for example, a p-type upper cladding layer), and the contact layer 29e (for example, a p-type contact layer) are exposed on the side surfaces 37e of the waveguide mesa 37. In the present embodiment, the stacked semiconductor layer 28 is processed by single etching using a single mask (the first mask 35 in the present embodiment). The semiconductor layers included in the stacked semiconductor layer 28 is simultaneously etched in the step of forming the waveguide mesa 37. Thus, at any position on a longitudinal axis of the waveguide mesa 37, the intermediate cladding layer 29b, the first core layer 29c, the upper cladding layer 29d, and p-InGaAs contact layer 29e in the first portion 37a and the second portion 37b of the waveguide mesa 37 have substantially the same width within etching variation. Thus, the semiconductor layers in the waveguide mesa 37 have a substantially constant width in the thickness direction. Thus, the width of the intermediate cladding layer 29b, the first core layer 29c, the upper cladding layer 29d, and the contact layer 29e can be regarded as the waveguide width of the waveguide mesa 37.

Figure 6A:
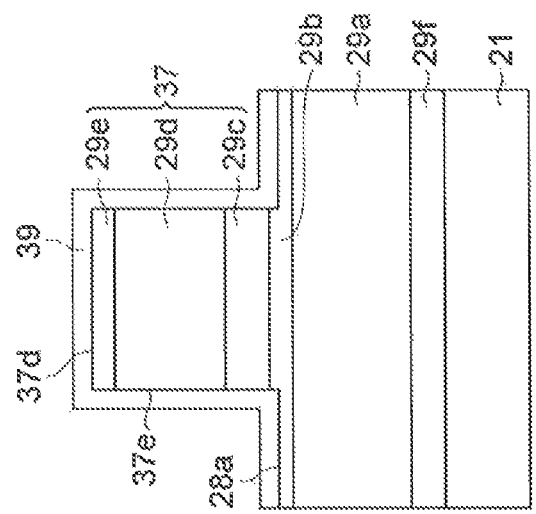
FIGS. 6A and 6B are schematic views of a main step of a method for manufacturing a semiconductor optical waveguide device according to the first embodiment.
Figure 6B:
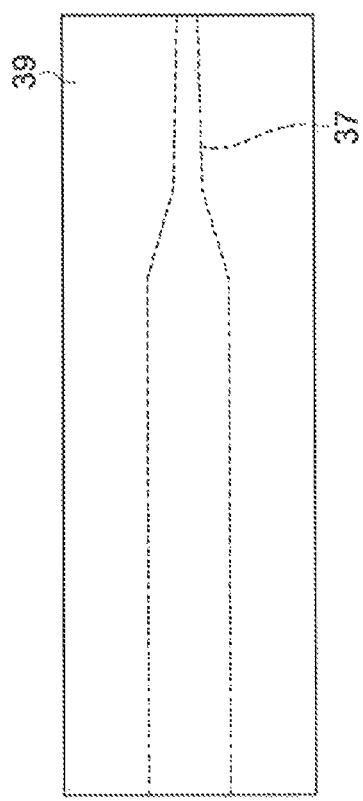

As illustrated in FIGS. 6A and 6B, after the waveguide mesa 37 is formed, an inorganic insulating layer 39 is formed on the substrate 21. The inorganic insulating layer 39 covers the top surface 37d and the side surfaces 37e of the waveguide mesa 37 and the etched surface 28a of the stacked semiconductor layer 28. The inorganic insulating layer 39 includes a silicon inorganic insulating layer such as a $SiO_2$ layer, a SiN layer, or a SiON layer. In this case, before the step of forming a dummy buried region described later, the inorganic insulating layer 39 is formed to cover the top surface 37d and the side surfaces 37e of the waveguide mesa 37. In the present embodiment, the inorganic insulating layer 39 is disposed on the waveguide mesa 37. The step of forming the inorganic insulating layer 39 may be omitted.

As illustrated in FIG. 7A, after the inorganic insulating layer 39 is formed, a dummy buried region 41 is formed. The dummy buried region 41 embeds the top surface 37d and the side surfaces 37e of the waveguide mesa 37. The material of the dummy buried region 41 is preferably applied, for example, by coating. The dummy buried region 41 formed by coating has a smaller surface roughness than the underlying waveguide mesa 37. This can provide flatness suitable for formation of a film and a mask. Thus, the dummy buried region 41 has a substantially flat surface. When the step of forming the inorganic insulating layer 39 is omitted, the dummy buried region 41 is formed on the top surface 37d and the side surfaces 37e of the waveguide mesa 37 and the etched surface 28a of the stacked semiconductor layer 28.

The dummy buried region 41 is made of, for example, spin-on-glass (SOG), indium tin oxide (ITO), benzocyclobutene (BCB) resin, or fluorine-based resin (for example, AL polymer (manufactured by Asahi Glass Co., Ltd.)). When these materials are used as the dummy buried region 41, the dummy buried region 41 is formed by using a coating method. A surface of the dummy buried region 41 formed of at least one of SOG, ITO, BCB resin, and fluorine-based resin is subsequently covered with an insulating layer.

As illustrated in FIG. 7B, an insulating layer 43 for forming a third mask is formed on the surface 41b of the dummy buried region 41. The insulating layer 43 covers the surface 41b of the dummy buried region 41. The insulating layer 43 includes a silicon inorganic insulating layer such as a $SiO_2$ layer, a SiON layer, or a SiN layer. The step of forming the insulating layer 43 may be omitted.

As illustrated in FIG. 7C, a second mask 45 is formed on the insulating layer 43. When the step of forming the insulating layer 43 is omitted, the second mask 45 is formed on the surface 41b of the dummy buried region 41. The second mask 45 is formed of a resist mask 47 on the substrate 21 including the first area 21b, the second area 21c, and the third area 21d. The resist mask 47 has a pattern 47a and an opening 47b. The opening 47b in the resist mask 47 on the first area 21b has a larger width than a width of the waveguide mesa 37. The resist mask 47 has a pattern that defines a taper-shaped structure on the second area 21c. The resist mask 47 covers the waveguide mesa 37 on the third area 21d. The resist mask 47 has the opening 47b on the first portion 37a of the waveguide mesa 37 and the pattern 47a on the second portion 37b and the third portion 37c of the waveguide mesa 37. The pattern 47a of the resist mask 47 preferably covers the dummy buried region 41 on the third area 21d. Through these steps, the second mask 45 is formed on the waveguide mesa 37, the stacked semiconductor layer 28, and the principal surface 21a of the substrate 21.

As illustrated in FIGS. 8A and 8B, the insulating layer 43 is dry-etched through the resist mask 47 of the second mask 45. An insulating layer mask 43a is formed by the etching. FIG. 8B is a cross section taken along the line I-I of FIG. 8A.

The second mask 45 includes a mask portion 45c and a mask portion 45d. The mask portion 45c has a pattern that has a smaller width than a width of the waveguide mesa on the second portion 37b of the waveguide mesa 37. The mask portion 45d has a pattern that has a larger width than a width of the waveguide mesa on the second portion 37b and the third portion 37c of the waveguide mesa 37. Thus, an upper mesa that has a mesa structure having substantially the same width as the waveguide mesa 37 and an upper mesa that has a mesa structure having a smaller width than the waveguide mesa 37 are simultaneously formed from the waveguide mesa 37 by combinations of the pattern width of the second mask 45 and the waveguide mesa width on the waveguide mesa 37.

As illustrated in FIGS. 9A and 9B, a third mask 51 is formed. FIG. 9B is a cross section taken along the line II-II (corresponding to the line I-I) of FIG. 9A. The third mask 51 has an opening that reaches the top surface 37d of the first portion 37a and the second portion 37b of the waveguide mesa 37. In order to form the third mask 51, the dummy buried region 41 and the inorganic insulating layer 39 are etched to the top surface 37d of the first portion 37a and the second portion 37b of the waveguide mesa 37 by using the second mask 45, thereby forming a dummy buried mask 41a. While an opening is formed in the dummy buried region 41, an opening is formed in the inorganic insulating layer 39 on the top surface 37d of the first portion 37a and the second portion 37b of the waveguide mesa 37 through the second mask 45, and an insulating layer mask is formed from the inorganic insulating layer 39. While the inorganic insulating layer 39 is processed, the inorganic insulating layer 39 on the side surfaces 37e of the waveguide mesa 37 is covered with the dummy buried mask 41a. Thus, the insulating layer mask is formed by transferring the pattern of the dummy buried mask 41a to the inorganic insulating layer. In the present embodiment, the dummy buried region 41 is formed on the inorganic insulating layer 39 by coating. The waveguide mesa 37 is etched through the dummy buried mask 41a and the insulating layer mask after the second mask 45 is removed. The insulating layer mask covers the side surfaces 37e of the waveguide mesa 37. Thus, the inorganic insulating layer 39 formed before the coating of the dummy buried region 41 protects the surface of the waveguide mesa 37 from the material of the dummy buried region 41. In addition, the insulating layer mask made from the inorganic insulating layer 39 protects the side surfaces 37e of the waveguide mesa 37 in the step of etching the dummy buried region 41 and in the step of etching the waveguide mesa 37.

Figure 10A:
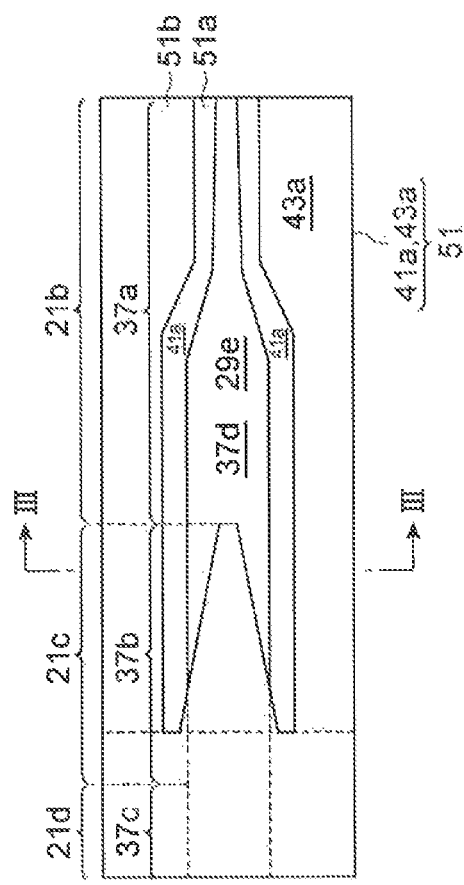
FIGS. 10A and 10B are schematic views of a main step of a method for manufacturing a semiconductor optical waveguide device according to the first embodiment.
Figure 10B:
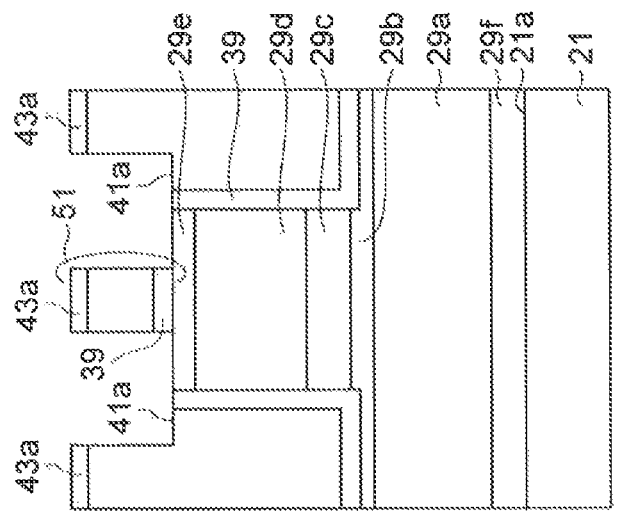

As illustrated in FIGS. 10A and 10B, the second mask 45 is then removed. In the present embodiment, this corresponds to the removal of the resist mask 47. As a result, the third mask 51 including the insulating layer mask 43a and the dummy buried mask 41a is formed. FIG. 10B is a cross section taken along the line III-III (corresponding to the line I-I) of FIG. 10A. The third mask 51 has an opening 51a on the first portion 37a and the second portion 37b of the waveguide mesa 37. The third mask 51 also has a pattern 51b on the second portion 37b and the third portion 37c of the waveguide mesa 37.

As illustrated in FIGS. 11A, 11B, and 11C, semiconductor layers of the waveguide mesa 37 are etched to the middle of the upper cladding layer 29d through the third mask 51 to form an upper mesa 53. The upper mesa 53 includes a first upper mesa portion 53a and a second upper mesa portion 53b on the first area 21b and the second area 21c, respectively, of the principal surface 21a of the substrate 21. In the embodiment, the upper mesa 53 also includes a third upper mesa portion on the third area 21d. The inorganic insulating layer 39 is not etched against an etchant for the semiconductor layers so that the inorganic insulating layer 39 is left. FIG. 11B is a cross section taken along the line IVb-IVb (corresponding to the line I-I) of FIG. 11A. FIG. 11C is a cross section taken along the line IVc-IVc of FIG. 11A. In this etching step, the semiconductor layers of the waveguide mesa 37 are etched such that the upper cladding layer 29d remains slightly.

After etching through the third mask 51, the second upper mesa portion 53b of the upper mesa 53 has a taper-shaped structure TAPER. The width of the taper-shaped structure TAPER changes monotonously along the waveguide axis Ax. The taper-shaped structure TAPER is formed by processing the second portion 37b of the waveguide mesa 37. The opening in the third mask 51 on the first area 21b has a larger width than a width of the second portion 37b of the waveguide mesa 37. A portion of the waveguide mesa 37 not covered with the third mask 51 on the second area 21c is etched.

As illustrated in FIGS. 12A, 12B, and 12C, while the third mask 51 remains, the third mask 51 on the top surface 53d of the upper mesa 53 and the side surfaces 53e of the upper mesa 53 are covered with a resist mask 55. FIG. 12A is a cross section taken along the line Vb-Vb of FIG. 12B. FIG. 12C is a cross section taken along the line Vc-Vc of FIG. 12B. The upper cladding layer 29d and the contact layer 29e appear on the side surfaces 53e of the upper mesa 53 on the second area 21c. The upper cladding layer 29d remains on the first area 21b. The upper cladding layer 29d remains on the top surface 53d of the upper mesa 53 on the second area 21c. The dummy buried mask 41a covers the surface 28a of the remainder of the stacked semiconductor layer 28 including the buffer layer 29f and the second core layer 29a on the principal surface 21a of the substrate 21. Thus, the upper cladding layer 29d in the waveguide mesa 37 is removed by etching through the insulating layer mask 43a, the dummy buried mask 41a, and the resist mask 55. This etching is performed by using a wet etching method. The first upper mesa portion 53a of the upper mesa 53 is disposed on the first area 21b of the principal surface 21a. The first upper mesa portion 53a includes the intermediate cladding layer 29b and the first core layer 29c. The second upper mesa portion 53b of the upper mesa 53 is disposed on the second area 21c of the principal surface 21a. The second upper mesa portion 53b includes the intermediate cladding layer 29b, the first core layer 29c, the upper cladding layer 29d, and the contact layer 29e.

As illustrated in FIGS. 13A, 13B, and 13C, while the third mask 51 remains, a portion of the waveguide mesa 37 not covered with the resist mask 55 is etched to a surface of the first core layer 29c. FIG. 13B is a cross section taken along the line VIb-VIb of FIG. 13A. FIG. 13C is a cross section taken along the line VIc-VIc of FIG. 13A. The remainder of the upper cladding layer 29d on the first core layer 29c on the top surfaces of the first upper mesa portion 53a and the second upper mesa portion 53b of the upper mesa 53 is removed by this etching. Thus, the top surface of the first upper mesa portion 53a of the upper mesa 53 is exposed.

As illustrated in FIGS. 14A, 14B, and 14C, while the third mask 51 remains, the resist mask 55 is removed. FIG. 14B is a cross section taken along the line VIIb-VIIb of FIG. 14A. FIG. 14C is a cross section taken along the line VIIc-VIIc of FIG. 14A.

Figure 15B:
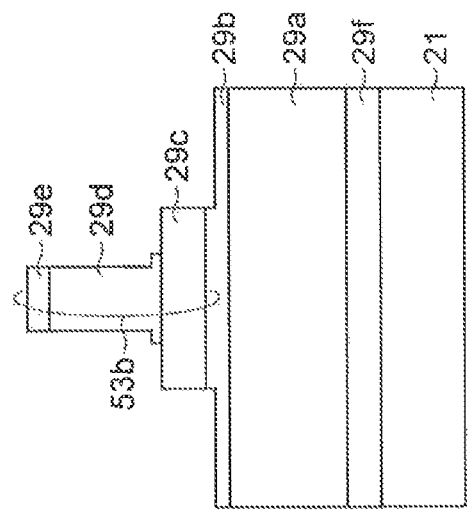
FIGS. 15A, 15B, and 15C are schematic views of a main step of a method for manufacturing a semiconductor optical waveguide device according to the first embodiment.
Figure 15C:
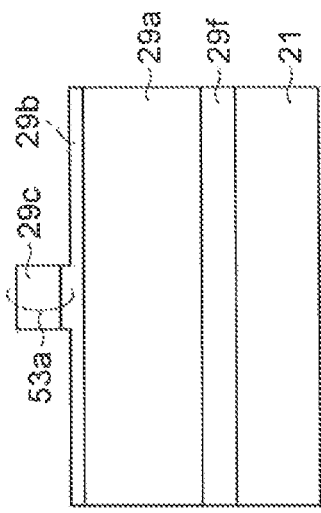
Figure 15A:
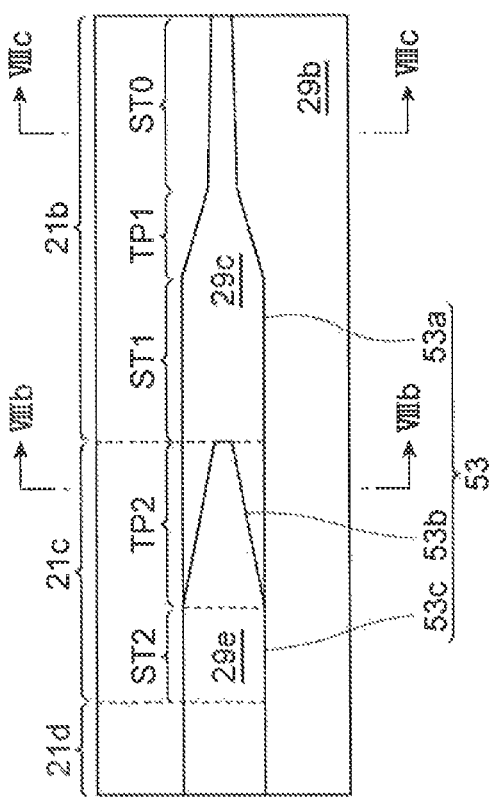

As illustrated in FIGS. 15A, 15B, and 15C, after the upper mesa 53 is formed, the third mask 51 is removed. Thus, the insulating layer mask 43a and the dummy buried mask 41a are removed. A buffered hydrofluoric acid (BHF) solution is used as an etchant for this removal, for example. The third mask 51 includes the insulating layer mask. The insulating layer mask formed from the inorganic insulating layer 39 is removed during the removal of the third mask 51. FIG. 15B is a cross section taken along the line VIIIb-VIIIb of FIG. 15A. FIG. 15C is a cross section taken along the line VIIIc-VIIIc of FIG. 15A. The upper mesa 53 is formed on the remainder of the stacked semiconductor layer 28. The surfaces of the first upper mesa portion 53a and the second upper mesa portion 53b of the upper mesa 53 are exposed. The intermediate cladding layer 29b on the second core layer 29a appears on both sides of the upper mesa 53. When the dummy buried mask 41a is formed of an ITO layer, the dummy buried mask 41a is removed using a buffered hydrofluoric acid (BHF) solution. When the dummy buried mask 41a is formed of a BCB resin or AL polymer, the dummy buried mask 41a is removed by plasma etching using $CF_4$ gas as an etching gas or by $O_2$ plasma processing, for example.

In a preferred embodiment, a third upper mesa portion 53c includes a stripe-shaped waveguide portion ST2 in which the first core layer 29c has substantially the same width as the upper cladding layer 29d. The second area 21c includes one area portion in contact with the third area 21d and the other area portion in contact with the first area 21b. The second upper mesa portion 53b includes, on the area portion of the second area 21c adjacent to the first area 21b, a stripe-shaped waveguide portion ST2 in which the first core layer 29c has substantially the same width as the upper cladding layer 29d. The stripe-shaped waveguide portion ST2 in the second upper mesa portion 53b is coupled to the stripe-shaped waveguide portion ST2 in the third upper mesa portion 53c. The second upper mesa portion 53b includes, on the area portion of the second area 21c adjacent to the first area 21b, a taper-shaped structure TP2 in which the upper cladding layer 29d has a width decreasing gradually relative to the upper cladding layer 29d in the stripe-shaped waveguide portion ST2 of the second upper mesa portion 53b on the other area portion of the second area 21c. In the taper-shaped structure TP2 on the area portion of the second area 21c adjacent to the first area 21b, the first core layer 29c in the second upper mesa portion 53b has substantially the same width as the stripe-shaped waveguide portion ST2. The first upper mesa portion 53a includes a stripe-shaped waveguide portion ST1 in which the first core layer 29c has substantially the same width as the first core layer 29c in the second upper mesa portion 53b. The stripe-shaped waveguide portion ST1 in the first upper mesa portion 53a is coupled to the first core layer 29c in the second upper mesa portion 53b. The first upper mesa portion 53a includes a taper-shaped structure TP1 in which the first core layer 29c has a width decreasing gradually relative to the first core layer 29c in the stripe-shaped waveguide portion ST1. The first upper mesa portion 53a includes a stripe-shaped structure ST0, which has a smaller width than a width of the first core layer 29c in the stripe-shaped waveguide portion ST1. The stripe-shaped structure ST0 extends on the first area 21b to an end portion END of the spot size converter (11a, 11c). If necessary, the stripe-shaped structure ST0 may be terminated between the end portion END and the taper-shaped structure TP1. As is understood from the above, the upper mesa 53 includes the stripe-shaped waveguide portion ST2 composed of the upper cladding layer 29d and the first core layer 29c, the taper-shaped structure TP2 composed of a portion including the upper cladding layer 29d and the first core layer 29c and a portion including the first core layer 29c, the stripe-shaped waveguide portion ST1 composed of the first core layer 29c, the taper-shaped structure TP1 composed of the first core layer 29c, and the stripe-shaped structure ST0 composed of the first core layer 29c.

As illustrated in FIGS. 16A, 16B, and 16C, after the third mask 51 is removed, an inorganic insulating layer 59 is formed on the first upper mesa portion 53a and the second upper mesa portion 53b of the upper mesa 53. The inorganic insulating layer 59 covers the top surface and side surfaces of the first upper mesa portion 53a and the second upper mesa portion 53b of the upper mesa 53. The inorganic insulating layer 59 includes a silicon inorganic insulating layer such as a $SiO_2$ layer, a SiN layer, or a SiON layer. FIG. 16B is a cross section taken along the line IXb-IXb of FIG. 16A. FIG. 16C is a cross section taken along the line IXc-IXc of FIG. 16A.

Figure 17B:
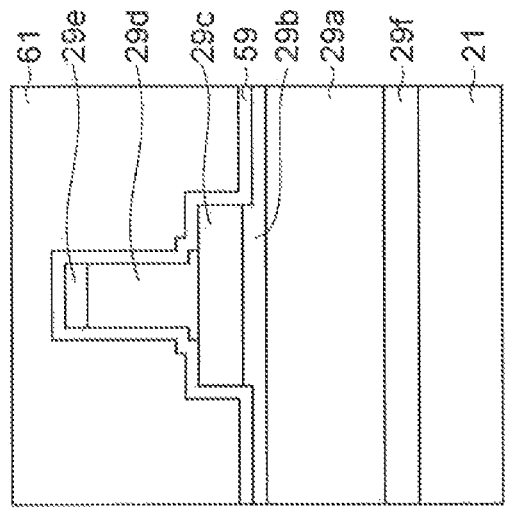
FIGS. 17A, 17B, and 17C are schematic views of a main step of a method for manufacturing a semiconductor optical waveguide device according to the first embodiment.
Figure 17C:
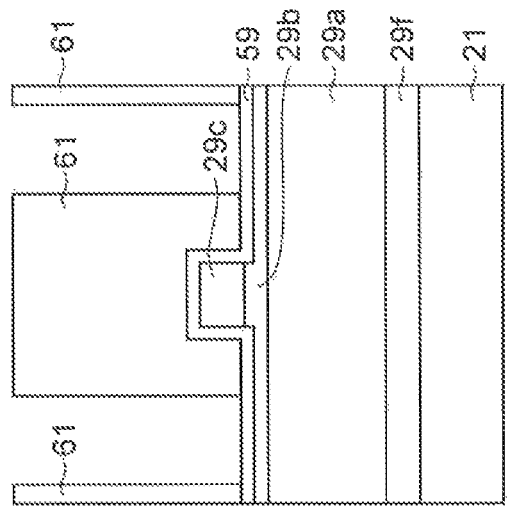
Figure 17A:
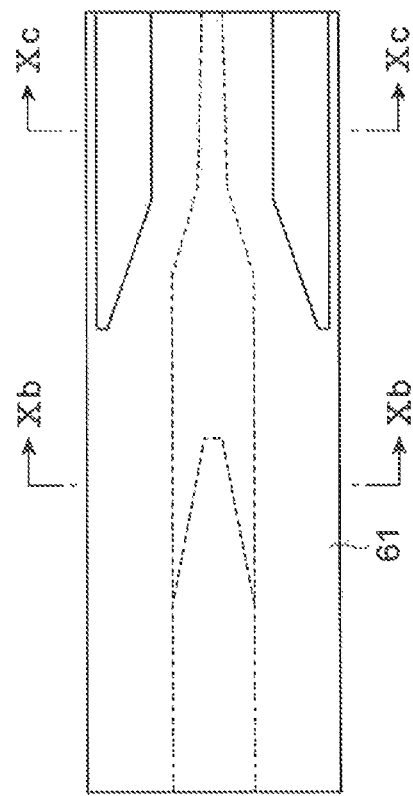

As illustrated in FIGS. 17A, 17B, and 17C, a resist mask 61 for defining the pattern of a lower mesa is formed on the inorganic insulating layer 59. FIG. 17B is a cross section taken along the line Xb-Xb of FIG. 17A. FIG. 17C is a cross section taken along the line Xc-Xc of FIG. 17A. The resist of the resist mask 61 is thick enough to cover a top surface of the upper mesa 53 including the first upper mesa portion 53a and the second upper mesa portion 53b.

As illustrated in FIGS. 18A, 18B, and 18C, the inorganic insulating layer 59 is etched through the resist mask 61 to form an insulating layer mask 59a. FIG. 18B is a cross section taken along the line XIb-XIb of FIG. 18A. FIG. 18C is a cross section taken along the line XIc-XIc of FIG. 18A. The insulating layer mask 59a on the first area 21b has a pattern and an opening to form a lower mesa 63 having a width greater than the width of the upper mesa 53. After the etching, the resist mask 61 is removed.

As illustrated in FIGS. 19A, 19B, and 19C, the remainder of the stacked semiconductor layer 28 (the intermediate cladding layer 29b and the second core layer 29a) is etched through the insulating layer mask 59a by using a dry etching method to form the lower mesa 63. The lower mesa 63 includes the second core layer 29a. FIG. 19B is a cross section taken along the line XIIb-XIIb of FIG. 19A. FIG. 19C is a cross section taken along the line XIIc-XIIc of FIG. 19A. The lower mesa 63 on the first area 21b has a larger width than a width of the upper mesa 53. The second core layer 29a, the intermediate cladding layer 29b, the first core layer 29c, the upper cladding layer 29d, and the contact layer 29e of the stacked semiconductor layer 28 are sequentially arranged on the principal surface 21a of the substrate 21. The upper mesa 53 includes the upper cladding layer 29d and the first core layer 29c. The first core layer 29c is formed of a semiconductor layer. The second core layer 29a is also formed of a semiconductor layer.

Figure 20B:
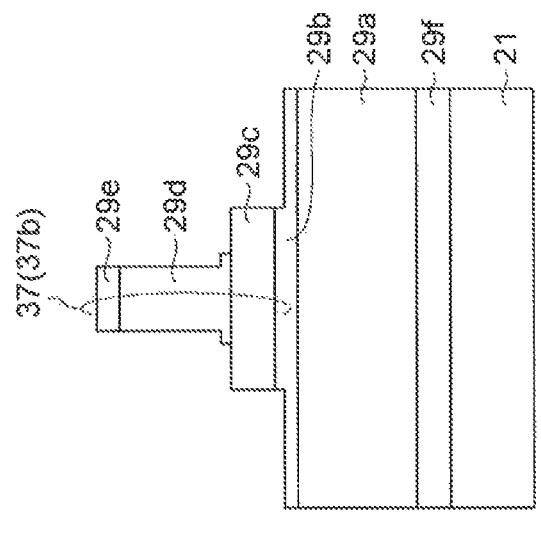
FIGS. 20A, 20B, and 20C are schematic views of a main step of a method for manufacturing a semiconductor optical waveguide device according to the first embodiment.
Figure 20C:
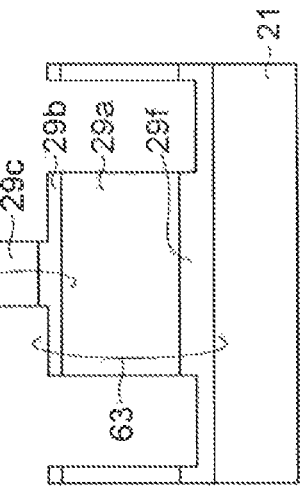
Figure 20A:
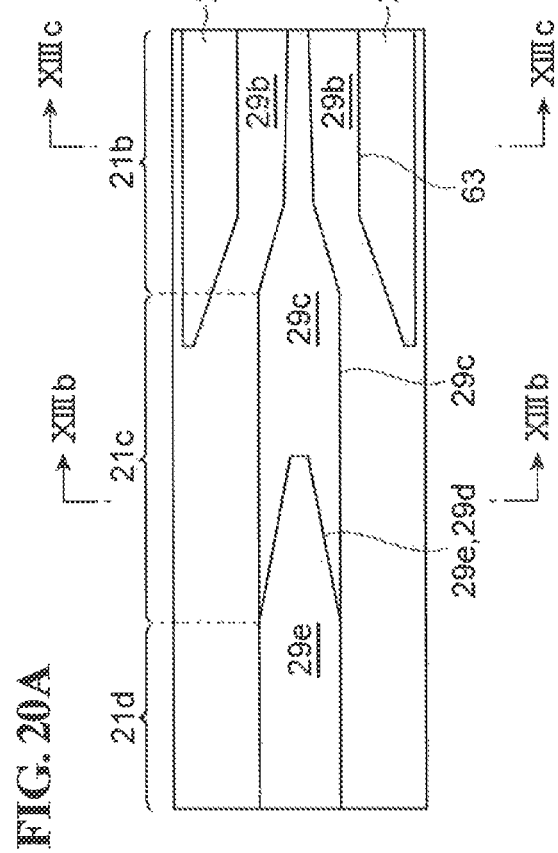

As illustrated in FIGS. 20A, 20B, and 20C, after dry etching to form the lower mesa 63, the insulating layer mask 59a is removed. In this manufacturing method, the upper mesa 53 and the lower mesa 63 are vertically arranged. FIG. 20B is a cross section taken along the line XIIIb-XIIIb of FIG. 20A. FIG. 20C is a cross section taken along the line XIIIc-XIIIc of FIG. 20A. The second core layer 29a, the intermediate cladding layer 29b, the first core layer 29c, the upper cladding layer 29d, and the contact layer 29e of the stacked semiconductor layer 28 are sequentially arranged on the principal surface 21a of the substrate 21. Thus, the first core layer 29c of the upper mesa 53 is optically coupled to the second core layer 29a of the lower mesa 63 through the intermediate cladding layer 29b. Thus, the semiconductor optical waveguide device 11 that includes a stacked semiconductor layer including vertically arranged core layers is provided.

In this manufacturing method, after the waveguide mesa 37 that includes the upper cladding layer 29d and the first core layer 29c is formed, the dummy buried region 41 embedding the top surface 37d and the side surfaces 37e of the waveguide mesa 37 is formed. The second mask 45 is formed on the dummy buried region 41. The second mask 45 has an opening on the first portion 37a of the waveguide mesa 37. In addition, the second mask 45 has an opening and a pattern on the second portion 37b of the waveguide mesa 37. The second mask 45 also has a pattern on the third portion 37c of the waveguide mesa 37. Because the second mask 45 is formed on the substantially flat surface of the dummy buried region 41, the second mask 45 having a fine pattern with high precision is formed.

The dummy buried region 41 is etched through the second mask 45 to form the third mask 51. The third mask 51 includes the dummy buried mask 41a to which the patterns of the second mask 45 are transferred. The third mask 51 has an opening that reaches the top surface 37d of the first portion 37a of the waveguide mesa 37. The first portion 37a of the waveguide mesa 37 is etched through the third mask 51 to form the upper mesa 53, which has a shape defined by the mask patterns on the second portion 37b and the third portion 37c. The upper mesa 53 includes the upper cladding layer 29d and the first core layer 29c.

After the upper mesa 53 is formed, the remainder of the stacked semiconductor layer 28 is etched to form the lower mesa 63, which includes the second core layer 29a. The lower mesa 63 has a larger width than a width of the upper mesa 53. Thus, an optical waveguide included in the lower mesa 63 has a greater mode field diameter than an optical waveguide included in the upper mesa 53.

Figure 21A:
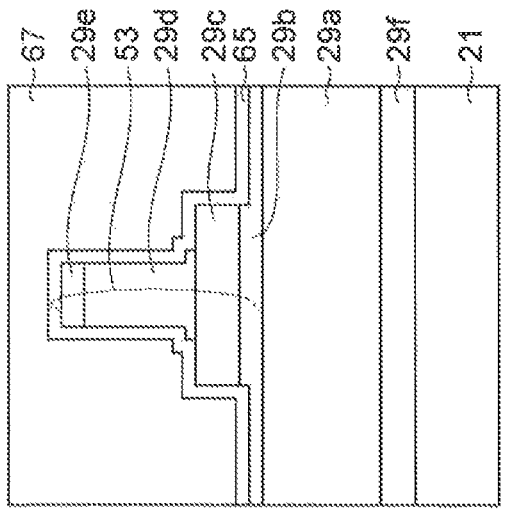
FIGS. 21A, 21B, and 21C are schematic views of a main step of a method for manufacturing a semiconductor optical waveguide device according to the first embodiment.
Figure 21B:
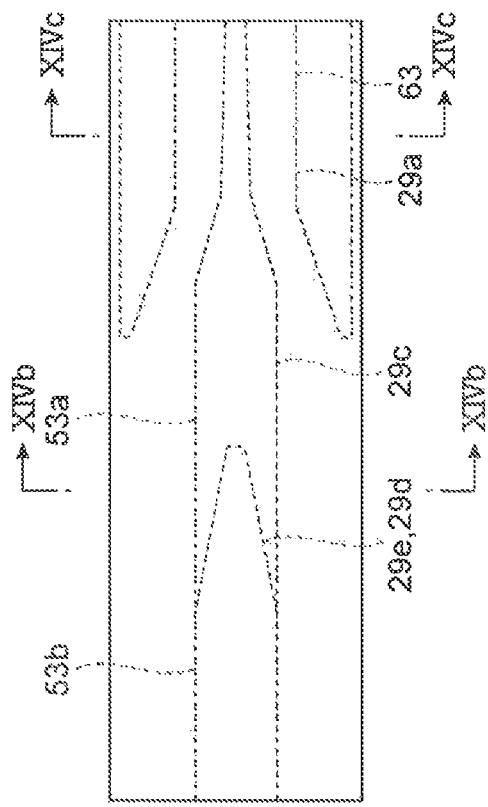
Figure 21C:
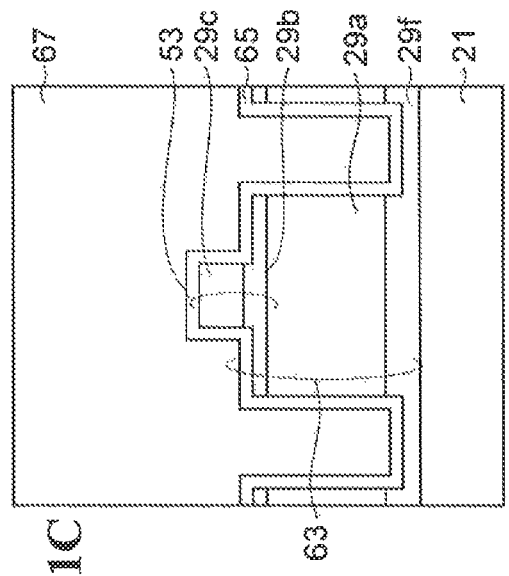

As illustrated in FIGS. 21A, 21B, and 21C, after the insulating layer mask 59a is removed, an insulating layer 65 is formed on the principal surface 21a of the substrate 21. FIG. 21B is a cross section taken along the line XIVb-XIVb of FIG. 21A. FIG. 21C is a cross section taken along the line XIVc-XIVc of FIG. 21A. The insulating layer 65 is formed of a silicon inorganic insulating layer such as a $SiO_2$ layer, a SiN layer, and a SiON layer. The insulating layer 65 entirely covers the upper mesa 53 and the lower mesa 63. After the insulating layer 65 is formed, an embedding resin 67 is applied on the insulating layer 65. The embedding resin 67 covers the insulating layer 65 on the upper mesa 53 and the lower mesa 63. The embedding resin 67 has a substantially flat surface. The embedding resin 67 is made of, for example, BCB resin.

Example 1

An InP buffer layer having a thickness of 0.1 μm, a second core layer having a MQW structure (thickness: 5 μm), a n-InP intermediate cladding layer having a thickness of 200 nm, a first core layer having a MQW structure (thickness: 500 nm), a p-InP upper cladding layer having a thickness of 1.25 μm, and a p-InGaAs contact layer having a thickness of 150 nm are grown on an InP semiconductor substrate by using a MOVPE method. The MQW structure of the second core layer is composed of n-InP layers each having a thickness of 50 nm and n-InGaAsP layers each having a thickness of 50 nm (photoluminescence (PL) peak wavelength: 1.1 μm) alternately stacked on top of one another. A top layer of the MQW structure of the second core layer is the n-InGaAsP layer (photoluminescence (PL) peak wavelength: 1.1 μm). The MQW structure of the first core layer is composed of AlInAs layers each having a thickness of 6 nm and AlGaInAs layers each having a thickness of 8 nm alternately stacked on top of one another. A top layer of the MQW structure of the first core layer is the AlInAs layer. These stacked semiconductor layers (epitaxial substrate) are provided for use in a spot size converter structure.

In order to form a waveguide, a SiN insulating layer is formed on the epitaxial substrate. A resist is then applied on the SiN layer. The SiN layer is formed by using a chemical vapor deposition (CVD) method. The resist layer is formed on the entire surface of the SiN layer by using a spin coating method. The resist is then subjected to exposure and development by photolithography, thereby forming a resist mask having a pattern for forming a waveguide mesa.

The SiN layer is then etched through the resist mask, for example, by using a reactive ion etching (RIE) method using $CF_4$ gas as an etching gas. The resist pattern is transferred to the SiN layer by the etching, thereby forming a SiN mask. The resist mask is then removed by an ashing process using $O_2$ gas and/or a dissolution process with an organic solvent.

The p-InGaAs contact layer, the p-InP upper cladding layer, the first core layer, and part of the n-InP intermediate cladding layer are then etched through the SiN mask, for example, by using a reactive ion etching (RIE) method, thereby forming a waveguide mesa. The SiN mask is then removed using buffered hydrofluoric acid (BHF). The waveguide mesa is formed in this manner.

An insulating layer, for example, formed of SiN is formed on a substrate product on which the waveguide mesa is formed. SOG is then applied on the insulating layer and embeds the waveguide mesa. The SOG layer has a flat surface. The substrate on which SOG is applied is then baked at 100° C. for 1 minute and at 200° C. for 1 minute. The substrate is then subjected to curing at 300° C. for 60 minutes. Although SOG is applied on the SiN layer in the present embodiment, SOG may be directly applied on the semiconductor layer.

A SiN layer, for example, having a thickness of 100 nm is then formed on the SOG layer. This SiN layer prevents the SOG layer from being broken by $O_2$ ashing in the subsequent steps.

In order to expose the top surface of the waveguide mesa, a resist mask is then formed. To this end, a resist is applied, exposed, and developed to form a resist mask having a desired pattern. The waveguide mesa is embedded in SOG and has a substantially flat SOG surface. Thus, a thin resist for high precision patterning can be used for the formation of an upper mesa.

A portion that becomes an end surface of a waveguide in each semiconductor device is etched so as to have a taper shape. The tip of the taper shape has a width of approximately 0.5 μm and is very narrow. This becomes possible due to patterning using the thin resist. The SiN layer, the SOG layer, and the underlying SiN layer are sequentially etched through the resist mask using $CF_4$ gas as an etchant, thereby exposing the top of the waveguide mesa. The resist mask is then removed by organic washing and $O_2$ ashing treatment, thereby forming a third mask.

The InGaAs contact layer and the InP upper cladding layer are then etched using the patterned SOG and SiN layers as masks. The SOG and SiN layers used as masks have an opening on the top surface of the waveguide mesa. Thus, the side surfaces and bottom surface of the waveguide mesa covered with the SOG or SiN layer are not etched.

When the InGaAs contact layer and the InP upper cladding layer are etched, it is desirable to stop etching directly above the core layer. However, the waveguide mesa does not have a constant width, and the etch rate itself has in-plane distribution. Thus, it is difficult to uniformly stop etching directly above the core layer on the entire wafer surface. The presence of a residual InP layer on the core layer increases optical loss in optical transition from the first core layer to the second core layer or from the second core layer to the first core layer. In order to avoid this, the InGaAs contact layer and the upper InP cladding layer are etched using a plasma monitor. Etching is immediately stopped when a signal of Ga element contained in the semiconductor layer of the core layer is detected by the endpoint detection with this monitor. Thus, etching is stopped directly above the MQW structure in a portion having the highest etch rate. The InP layer remains in the other portion. Due to a low etch rate resulting from the micro loading effect, the InP layer remains in greater amount in a portion having a small opening in the waveguide mesa than in a portion having a large opening. The remaining InP layer is removed by wet etching using diluted hydrochloric acid. In order to prevent the side surfaces of the taper-shaped portion from being exposed, the remaining InP layer is etched using diluted hydrochloric acid after the taper-shaped portion is covered with a resist mask. The resist mask is then removed by organic washing and $O_2$ ashing treatment.

After the resist mask is removed, the upper SiN layer, the SOG layer, and the lower SiN layer in contact with the semiconductor layer are removed by immersing the substrate product in buffered hydrofluoric acid (BHF). In order to etch the exposed n-InP layer, the second core layer, and the buffer layer to the substrate, a SiN layer and a patterned resist mask are sequentially formed on the substrate product on which the upper mesa of the waveguide is formed. The SiN layer is then etched through the resist mask, for example, by using a reactive ion etching (RIE) method using $CF_4$ gas as an etching gas, thereby transferring the resist pattern to the SiN layer. The resist mask is then removed, for example, by an ashing process using $O_2$ gas and/or a dissolution process with an organic solvent.

The second core layer, the InP buffer layer, and part of the substrate are then etched using the SiN layer to which the pattern is transferred as an etching mask, for example, by using a reactive ion etching (RIE) method. The SiN layer used as a mask is then removed using buffered hydrofluoric acid (BHF).

The mesa is then entirely covered with a $SiO_2$ layer. The device is then embedded in a cured BCB resin. Through these steps, a spot size converter is completed. Subsequently, an electrode is formed on a modulator portion in the optical waveguide device 11b so as to form a Mach-Zehnder (MZ) modulator, for example.

Second Embodiment

FIGS. 22A to 27C are schematic views of a main step of a method for manufacturing a semiconductor optical waveguide device according to a second embodiment. A waveguide mesa 37 is formed in the same manner as in the first embodiment illustrated in FIGS. 6A and 6B. The following description with reference to FIGS. 22 and 23 refers to a cross section corresponding to the cross section illustrated in FIG. 6A. After the waveguide mesa 37 is formed, as illustrated in FIG. 22A, the side surfaces and top surface of the waveguide mesa 37 are covered with a resin for forming a dummy buried region 41, thereby forming a resin body 69. The resin body 69 is composed of a resist and other components. In the present embodiment, an example in which a resist is used is described. As illustrated in FIG. 22B, the resin body 69 is etched to expose the top surface of the waveguide mesa 37. Thus, a lower resin body 69a is formed. In this etching, the surface of the resin body 69 is dry-etched to expose the top surface of the waveguide mesa 37. There may be a slight difference in level between the lower resin body 69a and the top surface of the waveguide mesa 37. However, this difference in level is much smaller than the difference in level of the waveguide mesa 37 itself that is a distance from a bottom surface to a top surface of the waveguide mesa 37. The lower resin body 69a covers the side surfaces of the waveguide mesa 37 and the surface 28a of the stacked semiconductor layer 28. After etching the resin body 69, the applied resist is baked to cure the lower resin body 69a. As illustrated in FIG. 22C, a resist 71 is then applied to a surface of the cured resin body (hereinafter referred to as a resin body 69b) and the top surface of the waveguide mesa 37. In this case, the cured resin body (resin body 69b) has a substantially flat surface.

As illustrated in FIG. 23A, the resist 71 is then subjected to exposure and development by photolithography, thereby forming a resist mask 73. In the present embodiment, the resist mask 73 has substantially the same pattern and opening as the resist mask 47 in the first embodiment. The resist mask 73 has a pattern 73a and an opening 73b. Specifically, the resist mask 73 has a pattern that defines a taper-shaped structure on the second area 21c. The resist mask 73 has the opening 73b on the first portion 37a of the waveguide mesa 37 and the pattern 73a on the second portion 37b of the waveguide mesa 37. The pattern 73a of the resist mask 73 covers part of the waveguide mesa 37 and part of the dummy buried region 41 on the second area 21c, and the dummy buried region 41 on the third area 21d. Through these steps, the waveguide mesa 37 and the second mask 45 defined by the resist mask 73 are formed on the stacked semiconductor layer 28 and the principal surface 21a.

When the dummy buried region 41 is formed of a resist, the dummy buried region 41 is formed by coating. Thus, the resist mask 73 serving as the second mask 45 is formed on the substantially flat underlayer. Also in this case, the second mask 45 includes the mask portion 45c and the mask portion 45d. The mask portion 45c has a pattern that has a smaller width than the width of the waveguide mesa. The mask portion 45d has a pattern that has a greater width than the width of the waveguide mesa. Thus, a mesa structure having substantially the same width as the waveguide mesa 37 and a mesa structure having a smaller width than the waveguide mesa 37 is simultaneously formed by combinations of the pattern width of the second mask 45 and the waveguide mesa width on the first portion 37a of the waveguide mesa 37.

As illustrated in FIG. 23B, the inorganic insulating layer 39 is etched using the resist mask 73 as the second mask 45 to form an insulating layer mask. As illustrated in FIG. 23C, the resist mask 73 and the resin body 69b are then removed. Portions of the inorganic insulating layer 39 remain on the side surfaces of the waveguide mesa 37 and on part of the top of the waveguide.

Figure 26A:
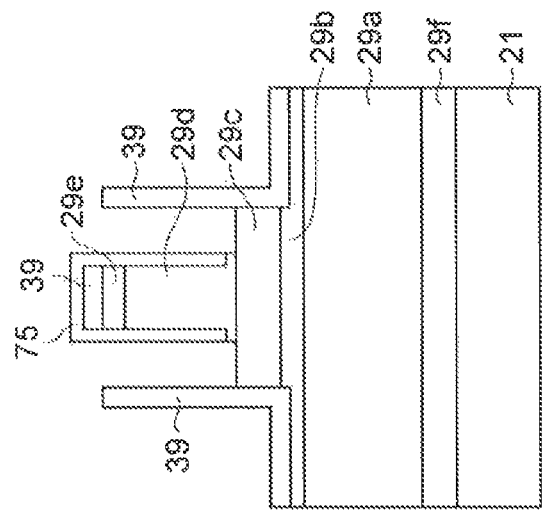
FIGS. 26A, 26B, and 26C are schematic views of a main step of a method for manufacturing a semiconductor optical waveguide device according to the second embodiment.
Figure 26B:
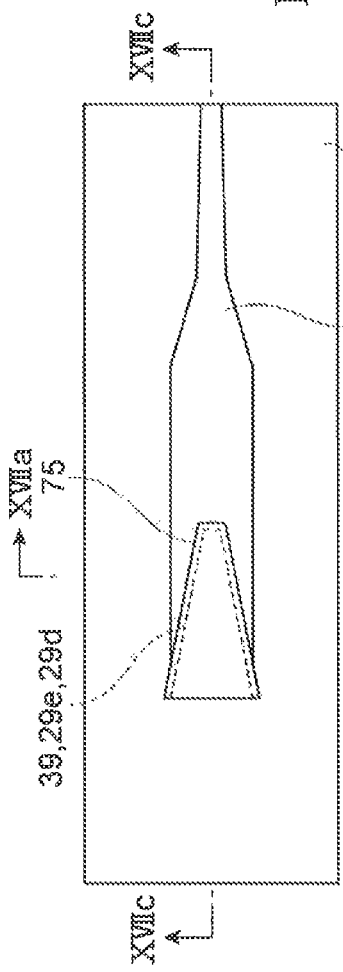
Figure 26C:
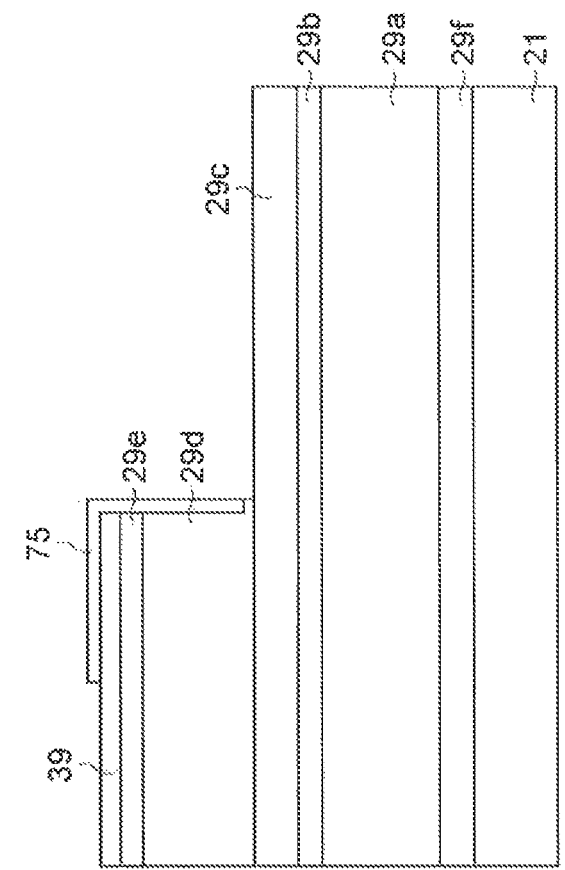
Figure 27A:
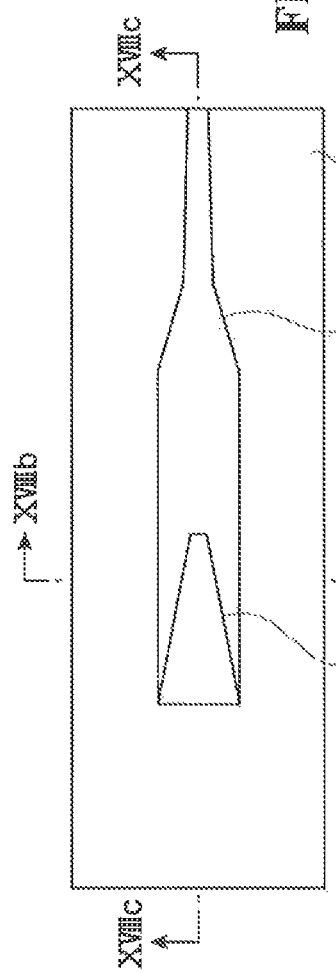
FIGS. 27A, 27B, and 27C are schematic views of a main step of a method for manufacturing a semiconductor optical waveguide device according to the second embodiment.
Figure 27B:
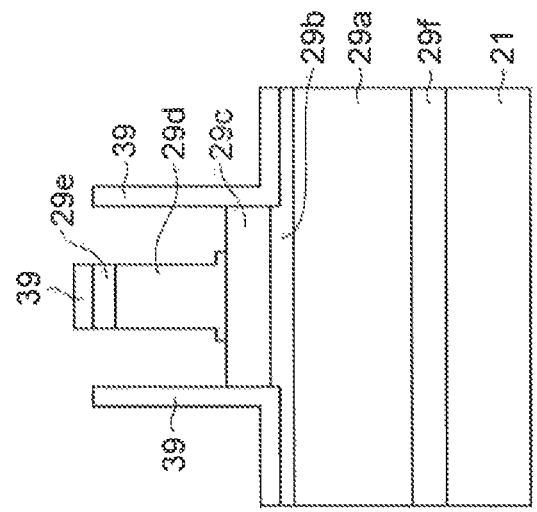
Figure 27C:
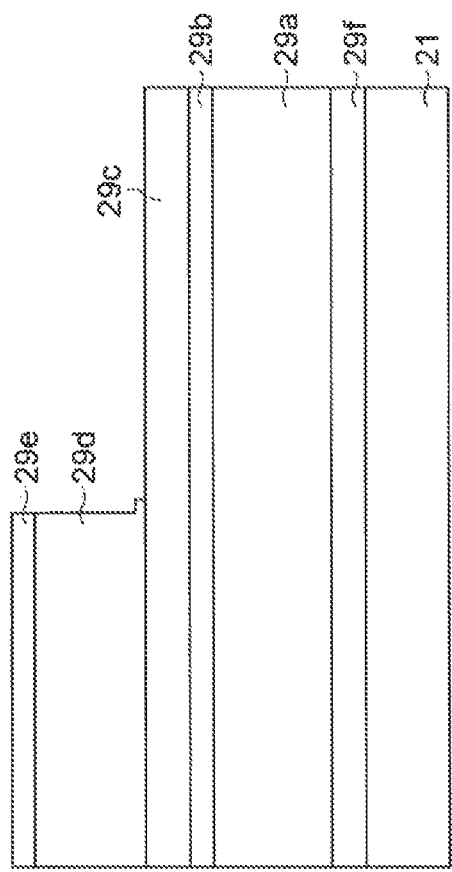

After the resist mask 73 and the resin body 69b are removed, the waveguide mesa 37 is etched, as illustrated in FIGS. 24A, 24B, and 24C. Thus, the upper mesa 53 is formed as in the first embodiment. FIG. 24A is a cross section taken along the line XVa-XVa of FIG. 24B. FIG. 24C is a cross section taken along the line XVc-XVc of FIG. 24B. After the upper mesa 53 is formed, in order to remove the upper cladding layer 29d slightly remaining on the first core layer 29c, as illustrated in FIGS. 25A, 25B, and 25C, a resist mask 75 that covers the top surface and side surfaces of the upper mesa 53 on the second area 21c (the resist mask 55 in the first embodiment, see FIGS. 12A to 12C) is formed. FIG. 25A is a cross section taken along the line XVIa-XVIa of FIG. 25B. FIG. 25C is a cross section taken along the line XVIc-XVIc of FIG. 25B. As illustrated in FIGS. 26A, 26B, and 26C, the upper cladding layer 29d slightly remaining on the first core layer 29c is removed through the resist mask 75 (the step illustrated in FIGS. 13A to 13C in the first embodiment). FIG. 26A is a cross section taken along the line XVIIa-XVIIa of FIG. 26B. FIG. 26C is a cross section taken along the line XVIIc-XVIIc of FIG. 26B. After the upper cladding layer 29d on the first core layer 29c is removed to expose the first core layer 29c, as illustrated in FIGS. 27A, 27B, and 27C, the resist mask 75 is removed (the step illustrated in FIGS. 14A to 14C in the first embodiment). FIG. 27B is a cross section taken along the line XVIIIb-XVIIIb of FIG. 27A. FIG. 27C is a cross section taken along the line XVIIIc-XVIIIc of FIG. 27A. After the resist mask 75 is removed, the inorganic insulating layer 39 is removed. These steps are followed by the step illustrated in FIGS. 15A to 15C in the first embodiment, and a spot size converter structure is formed in the same manner as in the first embodiment.

Example 2

In Example 2, a spot size converter structure is formed. First, an epitaxial substrate is manufactured in the same manner as in Example 1. In the same manner as in Example 1, a stacked semiconductor layer is then etched to form a waveguide mesa.

After the waveguide mesa is formed, a SiN layer is formed. The waveguide mesa is then embedded in a resist. A top of a portion of the waveguide is exposed by $O_2$ ashing or etching. The resist is then baked at 160° C. for 30 minutes to cure the resist. After baking, a resist is applied to the cured resist. This resist is subjected to exposure and development for patterning by photolithography. The underlying hard-baked resist is negligibly etched during development. The SiN layer is etched through the resist mask. Thus, a SiN layer mask is formed. The top of the waveguide mesa is partly exposed. The hard-baked resist and the resist mask are then removed by organic washing and $O_2$ ashing treatment. Semiconductor layers (an InGaAs contact layer and an upper InP cladding layer) are etched through the SiN layer mask. The SiN layer mask has an opening on the top of the waveguide. The side surfaces of the waveguide mesa and an etched surface formed in the step of forming the waveguide mesa are covered with the cured resist and are not etched.

When the InGaAs contact layer and the upper InP upper cladding layer are etched, it is desirable to stop etching directly above the core layer. However, the waveguide mesa has different widths at different portions thereof, and the etch rate itself has in-plane distribution. Thus, it is difficult to uniformly stop etching directly above the core layer on the entire wafer surface. The presence of a residual InP layer on the core layer increases optical loss in optical transition from the first core layer to the second core layer or from the second core layer to the first core layer. In order to avoid this, in the same manner as in Example 1, the InGaAs contact layer and the upper InP cladding layer are etched using a plasma monitor. Etching is immediately stopped in response to the detection of a signal of Ga element contained in the semiconductor layer of the core layer with this plasma monitor. Thus, etching is stopped directly above the MQW structure in a region having the highest etch rate on the surface of the wafer. The InP layer remains in the other portion of the wafer. The remaining InP layer is removed by etching using diluted hydrochloric acid in the same manner as in Example 1. The subsequent steps can be performed in the same manner as in Example 1.

Third Embodiment

FIGS. 28A to 34C are schematic views of a main step of a method for manufacturing a semiconductor optical waveguide device according to a third embodiment. A waveguide mesa 37 is formed in the same manner as in the first embodiment illustrated in FIGS. 6A and 6B. As illustrated in FIG. 28A, an insulating layer for forming the dummy buried region 41 is then formed to cover the side surfaces and top surface of the waveguide mesa 37. The insulating layer includes a tetraethyl orthosilicate (TEOS) oxide film. In the present embodiment, an example in which a TEOS oxide film is used is described. The insulating layer includes a TEOS oxide film in the dummy buried region 41. In a step of forming the dummy buried region 41 in which the waveguide mesa 37 is embedded, the TEOS oxide film is formed as a TEOS oxide film 77 so as to embed the top surface and side surfaces of the waveguide mesa 37. The surface 77a of the TEOS oxide film 77 protrudes on the waveguide mesa 37 due to the protrusion of the underlying waveguide mesa 37. The TEOS oxide film is formed by using the following method. For example, an organic silane compound containing tetraethyl orthosilicate (TEOS) is deposited, for example, by using a spin coating method such that the organic silane compound layer has a larger thickness than a height of the waveguide mesa 37. The side surface and the top surface of the waveguide mesa 37 are fully embedded by the organic silane compound layer. The TEOS oxide film 77 is formed by heating with a hot plate. The TEOS oxide film may also be formed by using a chemical vapor deposition (CVD) method using TEOS and oxygen gas as raw material gases.

As illustrated in FIG. 28B, the surface 77a of the TEOS oxide film 77 is polished by planarization treatment, for example, a chemical mechanical polishing (CMP) method. After polishing, a polished TEOS oxide film 79 is formed as the dummy buried region 41 from the TEOS oxide film 77. The surface 77a of the TEOS oxide film 77 is flattened to form the TEOS oxide film 79 having a polished flat surface 79a. In this manufacturing method, the TEOS oxide film 77 in the dummy buried region 41 has a surface profile that corresponds to the shape of the underlying waveguide mesa 37. In the subsequent step, the TEOS oxide film 77 is flattened to form the dummy buried region 41. Thus, also in this embodiment, a mask can be formed on a substantially flat surface. As illustrated in FIG. 28C, a resist is applied on the TEOS oxide film 79.

As illustrated in FIGS. 29A and 29B, the applied resist is then subjected to exposure and development by photolithography, thereby forming a resist mask 83. FIG. 29A is a cross section taken along the line XIXa-XIXa of FIG. 29B. In the present embodiment, the resist mask 83 has substantially the same pattern and opening as the resist mask 47 in the first embodiment. The resist mask 83 has a pattern 83a and an opening 83b. The opening 83b in the resist mask 83 on the first area 21b has a larger width than the width of the waveguide mesa 37. The resist mask 83 has a pattern that defines a taper-shaped structure on the second area 21c. The resist mask 83 has the opening 83b on the first portion 37a of the waveguide mesa 37. The resist mask 83 has the pattern 83a on the second portion 37b of the waveguide mesa 37. The pattern 83a of the resist mask 83 covers the dummy buried region 41 on the third area 21d. Through these steps, the resist mask 83 is formed as the second mask 45 on the waveguide mesa 37, the stacked semiconductor layer 28, and the principal surface 21a.

The second mask 45 includes a mask portion 45c and a mask portion 45d. The mask portion 45c has a pattern that has a smaller width than the width of the second portion 37b of the waveguide mesa 37. The mask portion 45d on the second portion 37b has a pattern that has a greater width than the width of the second portion 37b of the waveguide mesa 37. In this embodiment, therefore, a mesa structure having substantially the same width as the waveguide mesa 37 and a mesa structure having a smaller width than the waveguide mesa 37 is simultaneously formed by combinations of the pattern width of the second mask 45 and the waveguide mesa width on the first portion 37a of the waveguide mesa 37.

Figure 30A:
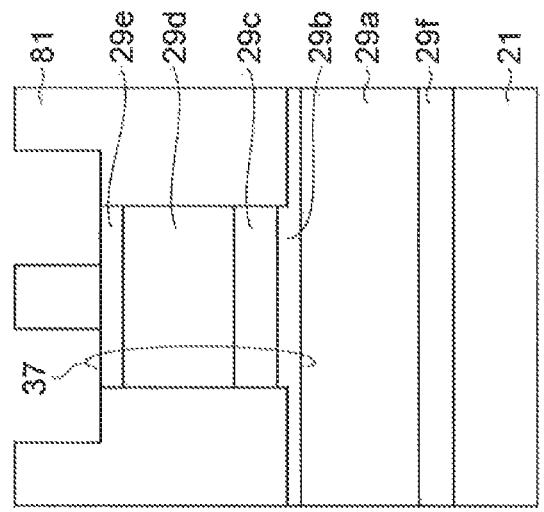
FIGS. 30A and 30B are schematic views of a main step of a method for manufacturing a semiconductor optical waveguide device according to the third embodiment.
Figure 30B:
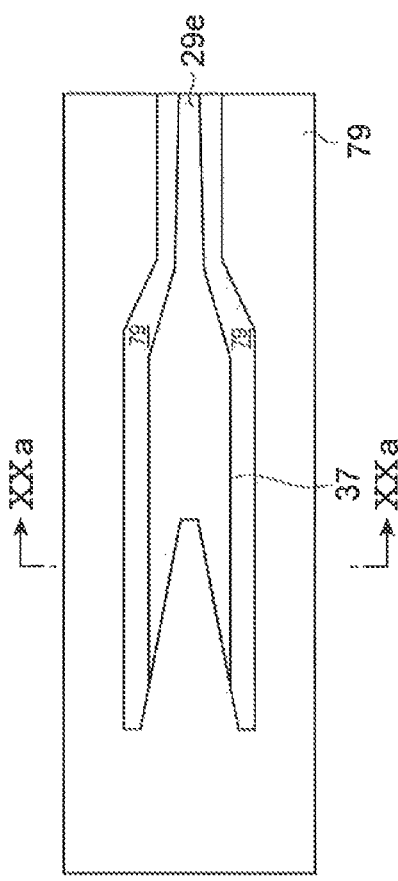

As illustrated in FIGS. 29A and 29B, the TEOS oxide film 79 is etched through the resist mask 83 (the second mask 45) to form a TEOS oxide film mask 81 as a third mask 51. The resist mask 83 includes a taper-shaped mask portion on the second portion 37b. The resist mask 83 covers the boundary between the waveguide mesa 37 and the dummy buried region 41 on the third portion 37c. As illustrated in FIGS. 30A and 30B, the resist mask 83 is removed, and the top surface of the TEOS oxide film mask 81 appears. FIG. 30A is a cross section taken along the line XXa-XXa of FIG. 30B. Thus, the waveguide mesa 37 is etched utilizing the difference in etch rate between the semiconductor layer and the oxide film. In other words, the semiconductor layer exposed from the TEOS oxide film mask 81 is selectively etched through the TEOS oxide film mask 81.

Figure 31A:
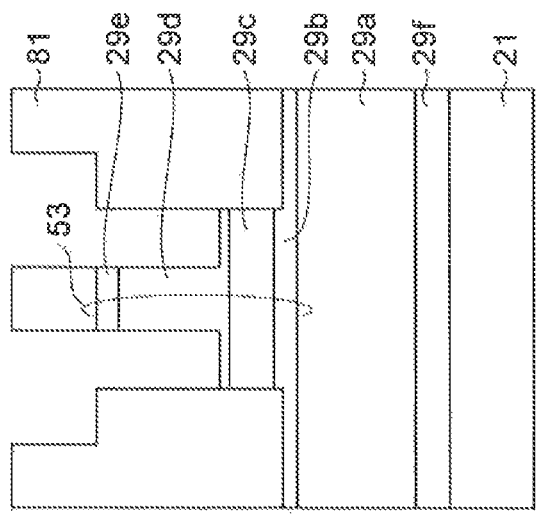
FIGS. 31A, 31B, and 31C are schematic views of a main step of a method for manufacturing a semiconductor optical waveguide device according to the third embodiment.
Figure 31B:
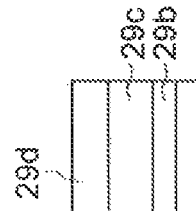
Figure 31C:
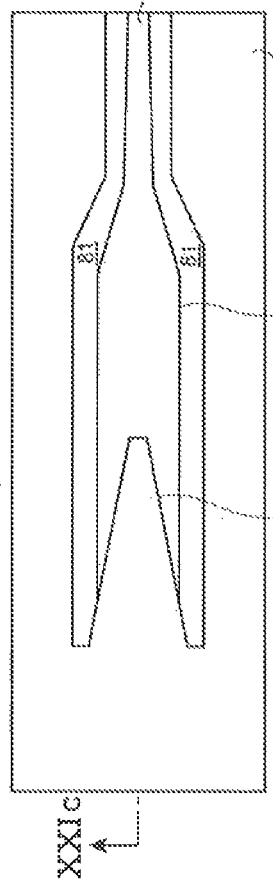
Figure 34A:
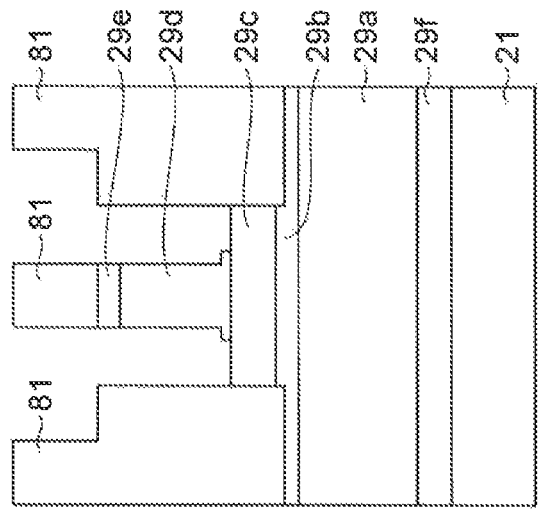
FIGS. 34A, 34B, and 34C are schematic views of a main step of a method for manufacturing a semiconductor optical waveguide device according to the third embodiment.
Figure 34B:
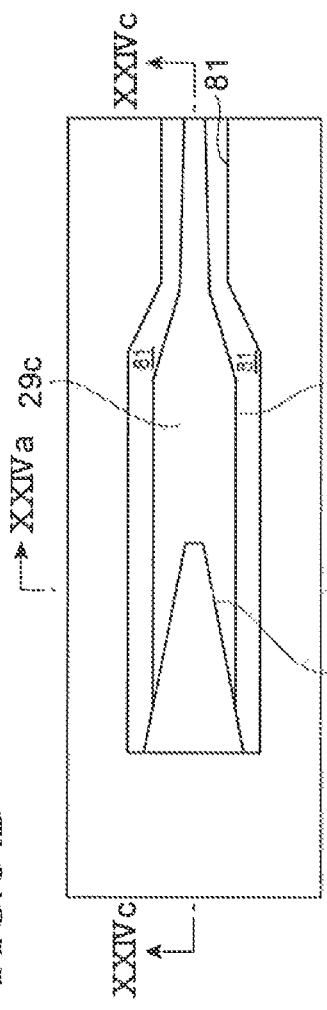
Figure 34C:
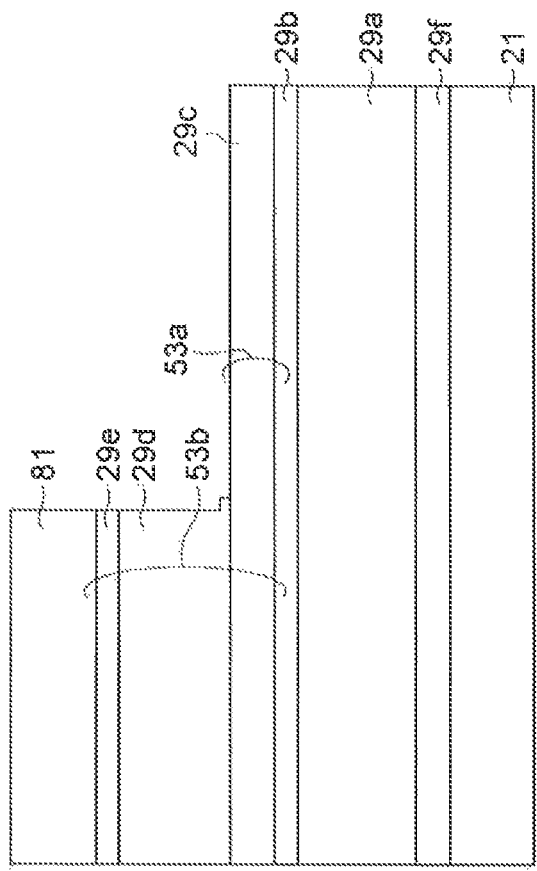

As illustrated in FIGS. 31A, 31B, and 31C, the waveguide mesa 37 is dry-etched to form the upper mesa 53 in the same manner as in the first embodiment. FIG. 31B is a cross section taken along the line XXIb-XXIb of FIG. 31A. FIG. 31C is a cross section taken along the line XXIc-XXIc of FIG. 31A. After the upper mesa 53 is formed, in order to remove the upper cladding layer 29d slightly remaining on the first core layer 29c, as illustrated in FIGS. 32A, 32B, and 32C, a resist mask 85 that covers the top surface and side surfaces of the upper mesa 53 on the second area 21c (the resist mask 55 in the first embodiment, see FIGS. 12A to 12C) is formed. FIG. 32A is a cross section taken along the line XXIIa-XXIIa of FIG. 32B. FIG. 32C is a cross section taken along the line XXIIc-XXIIc of FIG. 32B. As illustrated in FIGS. 33A, 33B, and 33C, the upper cladding layer 29d remaining on the first core layer 29c is removed through the resist mask 85 (the step illustrated in FIGS. 13A to 13C in the first embodiment). FIG. 33A is a cross section taken along the line XXIIIa-XXIIIa of FIG. 33B. FIG. 33C is a cross section taken along the line XXIIIc-XXIIIc of FIG. 33B. After the upper cladding layer 29d on the first core layer 29c is removed, as illustrated in FIGS. 34A, 34B, and 34C, the resist mask 85 is removed (the step illustrated in FIGS. 14A to 14C in the first embodiment). FIG. 34A is a cross section taken along the line XXIVa-XXIVa of FIG. 34B. FIG. 34C is a cross section taken along the line XXIVc-XXIVc of FIG. 34B. After the resist mask 85 is removed, the TEOS oxide film mask 81 is removed. These steps are followed by the step illustrated in FIGS. 15A to 15C in the first embodiment, and a spot size converter structure is formed in the same manner as in the first embodiment.

Example 3

A spot size converter structure is formed in the same manner as in Example 1. An epitaxial substrate is manufactured in the same manner as in Example 1. In the same manner as in Example 1, a stacked semiconductor layer is etched to form a waveguide mesa.

A TEOS oxide film (silicon dioxide ($SiO_2$) film) is then formed. The TEOS oxide film is formed so as to embed the waveguide. The TEOS oxide film is then subjected to CMP polishing. The CMP polishing is stopped before the waveguide mesa is exposed. Thus, the $SiO_2$ film is flattened.

In order to partly expose the top surface of the waveguide mesa, the flat $SiO_2$ film is then patterned using a resist mask. A resist is applied and is subjected to exposure and development to form a desired pattern. Because the waveguide mesa is embedded in the TEOS oxide film, a thin resist for high precision patterning can be used. This allows fine patterning such that a taper-shaped portion has a width of approximately 0.5 μm at the tip thereof. The TEOS oxide film layer is etched through the resist mask by RIE etching using $CF_4$ gas, thereby exposing the top of the waveguide mesa. The resist mask is then removed by organic washing and $O_2$ ashing treatment.

The waveguide mesa is then etched through the oxide mask to expose the upper portion of the core layer. The insulating layer mask has an opening only on the top of the waveguide. The oxide mask protects the side surfaces of the waveguide mesa from etching.

When the InGaAs contact layer and the InP upper cladding layer are etched, it is desirable to stop etching directly above the core layer. However, the waveguide has different widths at different portions thereof, and the etch rate itself has in-plane distribution. Thus, it is difficult to uniformly stop etching directly above the core layer on the wafer surface. In a spot size converter, the presence of a residual InP layer on the core layer increases optical loss in optical transition from the first core layer to the second core layer or from the second core layer to the first core layer. In order to avoid this, in the same manner as in Example 1, the InGaAs contact layer and the InP upper cladding layer are etched using a plasma monitor. Etching is immediately stopped in response to the detection of a signal of Ga element contained in the semiconductor layer of the core layer with this plasma monitor. Thus, etching is stopped directly above the MQW structure in a region having the highest etch rate on the surface of the wafer, and the InP layer remains in the other portion of the wafer. The remaining InP layer is removed by etching using diluted hydrochloric acid in the same manner as in Example 1. The subsequent steps can be performed in the same manner as in Example 1.

The present invention is not limited to the specific structures disclosed in the present embodiments.

What is claimed is:

1. A method for manufacturing a semiconductor optical waveguide device, comprising the steps of:
    preparing a substrate having a principal surface, the principal surface including a first area and a second area sequentially arranged along a waveguide axis;
    forming a stacked semiconductor layer on the principal surface of the substrate, the stacked semiconductor layer including an upper cladding layer, a first core layer, an intermediate cladding layer, and a second core layer;
    forming a waveguide mesa having a first portion and a second portion on the first area and the second area of the substrate, respectively, by etching the stacked semiconductor layer through a first mask, the first portion and the second portion including the upper cladding layer and the first core layer;
    forming a dummy buried region that embeds a top surface and side surfaces of the waveguide mesa;
    forming a second mask on the dummy buried region, the second mask having an opening on the first portion of the waveguide mesa and having a pattern on the second portion of the waveguide mesa;
    forming a third mask having an opening that reaches a top surface of the first portion of the waveguide mesa, the third mask including a dummy buried mask formed by etching the dummy buried region through the second mask;
    forming an upper mesa having a first upper mesa portion and a second upper mesa portion on the first area and the second area of the substrate, respectively, by etching the waveguide mesa through the third mask; and
    after removing the third mask, forming a lower mesa including the second core layer by etching the stacked semiconductor layer, the lower mesa having a greater width than a width of the upper mesa.

2. The method for manufacturing a semiconductor optical waveguide device according to claim 1, wherein the second core layer, the intermediate cladding layer, the first core layer, and the upper cladding layer of the stacked semiconductor layer are sequentially disposed on the principal surface of the substrate.

3. The method for manufacturing a semiconductor optical waveguide device according to claim 1, further comprising:
a step of, after forming the waveguide mesa, forming an inorganic insulating layer on the substrate so as to cover the top surface and side surfaces of the waveguide mesa,
wherein the dummy buried region is formed on the inorganic insulating layer by coating,
in the step of forming the opening in the dummy buried region, the inorganic insulating layer on the top surfaces of the first portion and the second portion of the waveguide mesa is etched through the second mask to form an insulating layer mask,
the insulating layer mask covers the side surfaces of the waveguide mesa, and
the dummy buried region is made of a material different from the inorganic insulating layer.

4. The method for manufacturing a semiconductor optical waveguide device according to claim 3, wherein the inorganic insulating layer includes a silicon inorganic insulating layer.

5. The method for manufacturing a semiconductor optical waveguide device according to claim 1, wherein
the second mask includes a first mask portion having a pattern that has a smaller width than a width of the second portion of the waveguide mesa and a second mask portion having a pattern that has a greater width than the width of the second portion of the waveguide mesa, and
after etching through the third mask, the second upper mesa portion of the upper mesa has a taper-shaped structure formed by processing the second portion of the waveguide mesa, the taper-shaped structure having a width that changes monotonously along the waveguide axis.

6. The method for manufacturing a semiconductor optical waveguide device according to claim 1, wherein
the dummy buried region is made of benzocyclobutene resin, fluorine-based resin, spin-on-glass, or tin-doped indium oxide,
the second mask includes a resist mask, and
the opening of the third mask has a larger width than a width of the second portion of the waveguide mesa on the first area.

7. The method for manufacturing a semiconductor optical waveguide device according to claim 1, wherein
the step of forming the dummy buried region includes a step of applying a resin and a step of baking the resin to form a resin body,
the dummy buried region contains cured resist,
the second mask includes a resist mask, and
the opening of the third mask has a larger width than a width of the second portion of the waveguide mesa on the first area.

8. A method for manufacturing a semiconductor optical waveguide device, comprising the steps of:
preparing a substrate having a principal surface, the principal surface including a first area and a second area sequentially arranged along a waveguide axis;
forming a stacked semiconductor layer on the principal surface of the substrate, the stacked semiconductor layer including an upper cladding layer, a first core layer, an intermediate cladding layer, and a second core layer;
forming a waveguide mesa that has a first portion and a second portion on the first area and the second area of the substrate, respectively, by etching the stacked semiconductor layer through a first mask, the waveguide mesa including the upper cladding layer and the first core layer;
forming a dummy buried region that embeds a top surface and side surfaces of the waveguide mesa;
forming a second mask on the dummy buried region, the second mask having an opening on the first portion of the waveguide mesa and having a pattern on the second portion of the waveguide mesa;
forming a dummy buried mask having an opening that reaches a top surface of the first portion of the waveguide mesa by etching the dummy buried region through the second mask;
forming an upper mesa having a first upper mesa portion and a second upper mesa portion on the first area and the second area of the substrate, respectively, by etching the waveguide mesa through the dummy buried mask; and
after removing the dummy buried mask, forming a lower mesa including the second core layer by etching the stacked semiconductor layer, the lower mesa having a greater width than a width of the upper mesa,
wherein the second core layer, the intermediate cladding layer, the first core layer, and the upper cladding layer of the stacked semiconductor layer are sequentially disposed on the second area of the principal surface of the substrate.

9. The method for manufacturing a semiconductor optical waveguide device according to claim 8, wherein
the dummy buried region includes a TEOS oxide film, and
the step of forming the dummy buried region includes a step of forming a TEOS oxide film that embeds the top surface and the side surfaces of the waveguide mesa and a step of flattening the TEOS oxide film.

10. The method for manufacturing a semiconductor optical waveguide device according to claim 8, wherein the step of forming the dummy buried region includes
a step of forming an inorganic insulating layer on the substrate so as to cover the top surface and side surfaces of the waveguide mesa after the waveguide mesa is formed, and
a step of applying a material that embeds the top surface and side surfaces of the waveguide mesa.

11. A semiconductor optical waveguide device comprising:
a substrate having a principal surface, the principal surface including a first area and a second area arranged along a waveguide axis;
an upper mesa including a first upper mesa portion and a second upper mesa portion on the first area and the second area, respectively, the upper mesa including a first core layer; and
a lower mesa between the substrate and the upper mesa, the lower mesa including a second core layer, the lower mesa having a larger width than a width of the upper mesa, the lower mesa having an end surface configured to be optically coupled to an external optical waveguide,
wherein the first core layer of the upper mesa and the second core layer of the lower mesa on the second area are optically coupled through an intermediate cladding layer disposed between the first core layer and the second core layer,
the upper mesa includes an upper cladding layer on the first core layer on the second area and includes no upper cladding layer on the first core layer on the first area, and the first core layer of the upper mesa on the first area includes a portion that has a smaller width than a width of the first core layer on the second area and a portion that has the same width as the first core layer on the second area.

12. The semiconductor optical waveguide device according to claim 11, wherein the principal surface of the substrate further includes a third area, the upper mesa further includes a third upper mesa portion on the third area, the third upper mesa portion being optically coupled to the second upper mesa portion, the lower mesa and the first and second upper mesa portions of the upper mesa constitute a spot size converter, and the third upper mesa portion on the third area includes a semiconductor device that is coupled to the spot size converter.

\* \* \* \* \*